(12) United States Patent
Okada

(10) Patent No.: US 8,329,330 B2
(45) Date of Patent: Dec. 11, 2012

(54) POWER SUPPLY DEVICE WITH BATTERY CELL COOLING MECHANISM AND VEHICLE INCLUDING THE SAME

(75) Inventor: Wataru Okada, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 180 days.

(21) Appl. No.: 13/015,947

(22) Filed: Jan. 28, 2011

(65) Prior Publication Data

US 2011/0183179 A1   Jul. 28, 2011

(30) Foreign Application Priority Data

Jan. 28, 2010 (JP) .................................. 2010-017492

(51) Int. Cl.
*H01M 10/50* (2006.01)
(52) U.S. Cl. ........................................ 429/120; 429/152
(58) Field of Classification Search .................. None
See application file for complete search history.

(56) References Cited

U.S. PATENT DOCUMENTS

| | | | | |
|---|---|---|---|---|
| 2006/0093899 A1* | 5/2006 | Jeon et al. | .......................... | 429/99 |
| 2006/0115719 A1* | 6/2006 | Jeon et al. | .......................... | 429/156 |
| 2006/0240318 A1* | 10/2006 | Kim et al. | .......................... | 429/153 |
| 2007/0122695 A1* | 5/2007 | Kim et al. | .......................... | 429/152 |
| 2008/0160395 A1* | 7/2008 | Okada et al. | .......................... | 429/99 |
| 2009/0111010 A1* | 4/2009 | Okada et al. | .......................... | 429/120 |
| 2009/0274952 A1 | 11/2009 | Wood et al. | | |
| 2011/0104547 A1* | 5/2011 | Saito et al. | .......................... | 429/120 |

FOREIGN PATENT DOCUMENTS

| | | |
|---|---|---|
| EP | 2 317 586 | 5/2011 |
| JP | 2007-250515 | 9/2007 |

OTHER PUBLICATIONS

European Search Report (in English language) issued May 17, 2011 in corresponding European Patent Application No. 11 00 0625.

* cited by examiner

Primary Examiner — Cynthia Lee
(74) Attorney, Agent, or Firm — Wenderoth, Lind & Ponack, LLP

(57) ABSTRACT

A power supply device includes a battery block 3 of battery cells 1. Cooling gaps 4 are provided for flowing cooling gas between cells 1 from a side surface of the block 3 into the gaps 4. The width of a temperature equalizing plate 15 covering the side surface of the block 3 varies designed so that the amounts of the gas flowing into the gaps 4 are reduced toward the upstream side. The upstream side of the plate 15 is fastened to the block 3. The plate 15 includes protrusions 37 that protrude from the downstream side of the plate 15. Insertion portions 39 are arranged at positions of coupling members 11 corresponding to the protrusions 37 on side surface of the block 3. When the protrusions 37 of the plate 15 are inserted into the insertion portions 39, the plate 15 is attached to the coupling members 11.

13 Claims, 26 Drawing Sheets

POWER SUPPLY DEVICE WITH BATTERY CELL COOLING MECHANISM AND VEHICLE INCLUDING THE SAME

BACKGROUND OF THE INVENTION

1. Field of the Invention

The present invention relates to a power supply device that includes a plurality of battery cells arranged side by side with separators being interposed between the battery cells, and a vehicle using the power supply device.

2. Description of the Related Art

A power supply device or a battery system has been developed that includes a number of battery cells arranged side by side, and forcedly blows cooling air to cooling gaps between the battery cells. This type of power supply device or battery system is used for vehicles such as hybrid car and electric vehicle. Since this type of power supply device employs a number of battery cells, the battery cells will have temperature difference among them. In particular, in the case where the number of the battery cells arranged side by side is large, it is difficult to cool all the battery cells to uniform temperatures, in other words, to temperatures that fall within a small range. It is very important for a vehicle battery system including a number of battery cells arranged side by side to reduce the temperature difference among battery cells as small as possible. The reason is that temperature difference may cause uneven remaining capacities of the battery cells, and as a result deteriorate the life of some battery cells. The efficiency of batteries in charging/discharging operation varies in accordance with their temperatures. For this reason, in the case where batteries have temperature difference, even if the batteries are charged/discharged at the same current, the batteries will have different remaining capacities. If the batteries have different remaining capacities, when a battery is likely to have a larger remaining capacity, the battery is likely to be overcharged. On the other hand, when another battery is likely to have a smaller remaining capacity, the battery is likely to be over-discharged. If a battery is overcharged or over-discharged, the battery will deteriorate faster. As a result, the life of the vehicle battery system will be reduced. In particular, in the case of the vehicle battery system for hybrid car, plug-in hybrid car, electric vehicle and the like, since a number of side-by-side arranged batteries are provided to be charged/discharged at a large amount of current, its manufacturing cost will be very expensive. For this reason, it is important for the vehicle battery system to increase its life. In particular, as the number of batteries used in the vehicle battery system increases, its manufacturing cost increases. Also, from this viewpoint, it is required to increase the life of the vehicle battery system. Contrary to this, as the number of side-by-side arranged batteries increases, temperature difference in the vehicle battery system will increase, which in turn may reduce the life of vehicle battery system.

A vehicle battery system has been developed that includes a plurality of battery cells arranged side by side, and forcedly blows cooling air to cooling space between the battery cells (Japanese Patent Laid-Open Publication 2007-250515).

In the vehicle battery system disclosed in Japanese Patent Laid-Open Publication 2007-250515, as shown in a cross-sectional view of FIG. 27, cooling gaps 103 are formed between battery cells 101 of battery block 110, and inlet and outlet ducts 106 and 107 are provided on the both sides of the battery block 110. The vehicle battery system forcedly blows cooling air through the inlet duct 106 to the cooling gap 103 so that the cooling air is discharged through the outlet duct 107. Thus, the battery cell 101 is cooled.

However, in the system in that the battery cells are cooled one after another by the cooling air, although a battery cell located closer to the inlet duct is cooled well by cold cooling air that just arrives at this battery cell, the cooling air is forcedly moved and is gradually heated by repeated heat exchange between the cooling air and battery cells. For this reason, there is a problem in that, when battery cells are arranged side by side in the longitudinal direction of a cooling duct, temperature difference will arise due to the positional difference among the battery cells. Such temperature difference among the battery cells may cause property deterioration of a battery cell and life difference among the battery cells. In particular, the output of the battery system is restricted by a battery cell having the lowest temperature. For this reason, in order to maximize the performance of the battery system, ideally, it is desired to bring ΔT (the difference between the highest and lowest battery temperatures) to zero.

In order to solve the aforementioned problem, the applicant has developed power supply devices shown in FIGS. 28 and 29. In the power supply device shown in FIG. 28, temperature equalizing plates 2815 are fastened to bind bars 2811 that couple battery cells 1 of a battery block 283 to each other. Also, in the power supply device shown in FIG. 29, temperature equalizing plates are formed integrally with bind bars 2911 that couple battery cells 1 of a battery block 293 to each other. The temperature equalizing plates are arranged on side surfaces of the battery block 283 or 293, and partially close the cooling gaps 284 or 294 between the battery cells 1. The opening area of the temperature equalizing plate is gradually changed so that the cooling gap 284 or 294 gets narrower particularly toward the upstream side into which cooling gas is blown. In the battery blocks 283 and 293, the amounts of blowing cooling gas are adjusted for battery cells one by one by the temperature equalizing plates so that the temperature difference among the battery cells 1 can be reduced.

However, in this construction, since the bind bar is constructed as the temperature equalizing plate, the bind bars will be required to have different shapes and sizes depending on the sizes of battery cells and the number of side-by-side arranged battery cells. Accordingly, bind bars will be necessarily redesigned specially for battery blocks. As a result, there is a problem that the cost will be increased.

In order to further solve this problem, the applicant has developed power supply devices shown in FIG. 30. In this power supply device, a temperature equalizing plate 3015 separate from the bind bar is attached onto a side surface of a battery block 303. The temperature equalizing plate 3015 is formed of plastic with flexibility, and is fastened to an end plate 310 on the battery block 303 end surface. The shape of the temperature equalizing plate 3015 is designed to restrict cooling effect on battery cells. The restriction amount gets larger as closer to a battery cell on the upstream side of cooling gas. The restriction is achieved by closing cooling gaps 304 with the temperature equalizing plate 3015. The closing amount gets smaller along the flowing direction of cooling gas. In this battery block 303, the temperature equalizing plate 3015 serves as a baffle so that the amount of blowing cooling gas is regulated. As a result, the temperature difference among the battery cells 1 can be reduced.

However, since the temperature equalizing plate is constantly blown with the forcedly blowing cooling gas, the blowing cooling gas causes a free end of the temperature equalizing plate to fluster. As a result, there is a problem that the temperature equalizing plate produces noise. In addition to aged deterioration of the temperature equalizing plate, such flustering movement may cause deterioration of the resin temperature equalizing plate in strength. Such deterioration may facilitate flustering movement. In particular, in the case where the power supply device is used as a vehicle power supply device, since the power supply device is subjected to vibrations, such deterioration will be accelerated. In addition, when the temperature equalizing plate flusters, the cooling gap may be insufficiently closed so that battery cells may be insufficiently uniformly cooled.

The present invention is devised to further solve the above problems. It is a main object of the present invention is to provide a power supply device that can reduce temperature difference among battery cells and can suppress noise production, and a vehicle including the power supply device.

SUMMARY OF THE INVENTION

To achieve the above object, a power supply device according to a first aspect of the present invention includes a battery block 3, coupling members 11, and a temperature equalizing plate 15. The battery block 3 includes a plurality of battery cells 1 arranged side by side. The cooling gaps 4 are formed for flowing cooling gas between battery cells 1. The coupling members 11 extend in the side-by-side arrangement direction of the battery cells 1, and couple the plurality of battery cells 1 to each other in the side-by-side arrangement. The temperature equalizing plate 15 is arranged on a side surface of the battery block 3, and at least partially closes openings of some of the cooling gaps 4 on the cooling gas inlet side of the cooling gaps 4. The cooling gas is blown from the side surface of the battery block 3 into the cooling gaps 4 so that the battery cells 1 are cooled. The temperature equalizing plate 15 covers the side surface of the battery block 3. The width of the temperature equalizing plate 15 varies so that the amounts of the cooling gas flowing into the cooling gaps 4 is reduced as the battery cells are located closer to the cooling gas upstream side. The cooling gas upstream side of the temperature equalizing plate 15 is fastened to the battery block 3. The temperature equalizing plate 15 includes attachment protrusions 37 that protrude from the cooling gas downstream side of the temperature equalizing plate 15. Protrusion insertion portions 39 are arranged at positions of the coupling members 11 corresponding to the attachment protrusions 37 on the side surface of the battery block 3 so that the attachment protrusions 37 can be inserted into the protrusion insertion portions 39. When the attachment protrusions 37 of the temperature equalizing plate 15 are inserted in the protrusion insertion portions 39 of the coupling members 11, the temperature equalizing plate 15 is attached to the coupling members 11. According to this construction, it is possible to suppress that blowing cooling gas causes the free end of the temperature equalizing plate to fluster, and to suppress noise production. Also, according to this construction, the protrusion insertion portions protrude from the side surface of the battery block. In the case where a plurality of battery blocks are arranged with their side surfaces facing to each other, the protrusion insertion portions of the adjacent battery blocks come in contact with each other. Accordingly, the battery blocks are held from the side surfaces by their protrusion insertion portions. Therefore, it is possible to provide an effect that the battery blocks can be stably secured at increased mechanical strength.

In a power supply device according to a second aspect of the present invention, the temperature equalizing plate 15 has a recessed surface on the side opposed to the battery block 3. An elastic member 41 is arranged on the recessed surface. According to this construction, since the elastic member arranged on the temperature equalizing plate comes in contact with the battery block, it is possible suppress that vibration sound of the temperature equalizing plate when coming in contact with the battery block. Therefore, it is possible to ensure low noise.

In a power supply device according to a third aspect of the present invention, the width of the elastic member 41 gradually decreases along the side-by-side arrangement direction of the battery cells 1 of the battery block 3. According to this construction, since the area of the elastic member is changed in addition to the area of the temperature equalizing plate, it is possible to provide an effect that the temperature difference $\Delta T$ among battery cells can be further reduced.

In a power supply device according to a fourth aspect of the present invention, the temperature equalizing plate 15 is curved protruding toward the battery block 3. According to this construction, since the temperature equalizing plate can be in contact with the battery block side as tight as possible, it is possible to increase an effect for closing the some of the cooling gaps.

In a power supply device according to a fifth aspect of the present invention, the shape of the temperature equalizing plate 15 is an isosceles trapezoid. According to this construction, the temperature equalizing plate can gradually change the opening areas of cooling gaps.

In a power supply device according to a sixth aspect of the present invention, the temperature equalizing plate 15 is fastened only on the cooling gas inlet-side side surface of the both side surface of the battery block 3. According to this construction, the amount of cooling gas that flows into cooling gaps can be effectively suppressed on the inlet side. Therefore, even in the case where the number of temperature equalizing plates is reduced, it is possible to uniformly cool the battery cells.

In a power supply device according to a seventh aspect of the present invention, the coupling member 11 is a metal bind bar 11X that has a constant width and extends in the side-by-side arrangement direction of the battery cells 1. The attachment protrusion 37 protrudes along the extension direction of the bind bar 11X, and has a width equal to or narrower than the width of the bind bar 11X. According to this construction, since the temperature equalizing plate can be fastened to the bind bars with the attachment protrusions overlapping the bind bars, the opening areas of the cooling gaps are hardly affected by the attachment protrusions. Therefore, the temperature equalizing plate can be fastened to the battery block without affecting the function of the temperature equalizing plate.

In a power supply device according to an eighth aspect of the present invention, the protrusion insertion portion 39 is formed by bending each of a pair of metal protrusions that protrude in the width direction of the bind bar 11X into a U shape as viewed in section. According to this construction, the protrusion insertion portion can be easily formed.

In a power supply device according to a ninth aspect of the present invention, the temperature equalizing plate 15 further includes protruding portions 38 that couple the attachment protrusions 37 to the temperature equalizing plate 15. When the temperature equalizing plate 15 is fastened onto the side surface of the battery block 3, the protruding portions 38 overlap one of the battery cells 1 of the battery block 3. According to this construction, the protruding portion is arranged at a position that does not overlap battery cells, that is, at a position where the protruding portion does not close cooling gaps. Accordingly, it is possible to avoid that the protruding portion interferes with the flow of the cooling gas into the cooling gaps. Therefore, it is possible to make full use of the capabilities of the temperature equalizing plate.

In a power supply device according to a tenth aspect of the present invention, a second protrusion insertion portion 39B is arranged at the symmetrical position to the protrusion insertion portion 39 with respect to the center of the coupling member 11 in the extension direction, and have the same shape as the protrusion insertion portion 39. According to this construction, since the coupling member has two protrusion insertion portions at the symmetrical positions, the temperature equalizing plate can be fastened to the coupling members irrespective of orientation of the coupling members. Accordingly, the power supply device can be assembled without concern for the orientation of the coupling members. As a result, the orientation mistake can be eliminated. Therefore, the assembling efficiency can be improved. In addition, in the case where a plurality of battery blocks are arranged side by side in parallel to each other as in the aforementioned case, two protrusion insertion portions of one battery block can contact two protrusion insertion portions of another adjacent battery block. Accordingly, the contact stress can be distributed to two protrusion insertion portions. As a result, battery blocks can be more firmly interposed between and held by holding members. For this reason, this construction is preferable in terms of reliability.

In a power supply device according to an eleventh aspect of the present invention, end plates 10 are further included that hold the side-by-side arranged battery cells 1 so that the side-by-side arranged battery cells 1 are sandwiched between the end plates 10 from both the ends of the battery block 3. The temperature equalizing plate 15 includes an interlocking hook 33 on the side opposite to the attachment protrusions 37. The end plate 10 has an interlocking hole 34 that interlocks with the interlocking hook 33. When the interlocking hook 33 is interlocked with the interlocking hole 34, the cooling gas upstream side of the temperature equalizing plate 15 is fastened to the battery block 3. According to this construction, there is an advantage that the both ends of the temperature equalizing plate can be easily and reliably fastened to the battery block by snap-in structures.

In a power supply device according to a twelfth aspect of the present invention, electrically-insulating separators 2 are further included that are sandwiched between battery cells 1 so that the cooling gaps 4 are formed in the battery block 3. According to this construction, the separators for insulating battery cells from each other can be used as spacers for forming the cooling gaps.

In a power supply device according to a thirteenth aspect of the present invention, the battery cells 1 are rectangular batteries. According to this construction, it is possible to uniformly cool the battery block that includes rectangular battery cells arranged side by side.

A vehicle according to a fourteenth aspect of the present invention includes the aforementioned power supply device.

The above and further objects of the present invention as well as the features thereof will become more apparent from the following detailed description to be made in conjunction with the accompanying drawings.

DETAILED DESCRIPTION OF THE EMBODIMENT(S)

The following description will describe embodiments according to the present invention with reference to the drawings.

Figure 6:
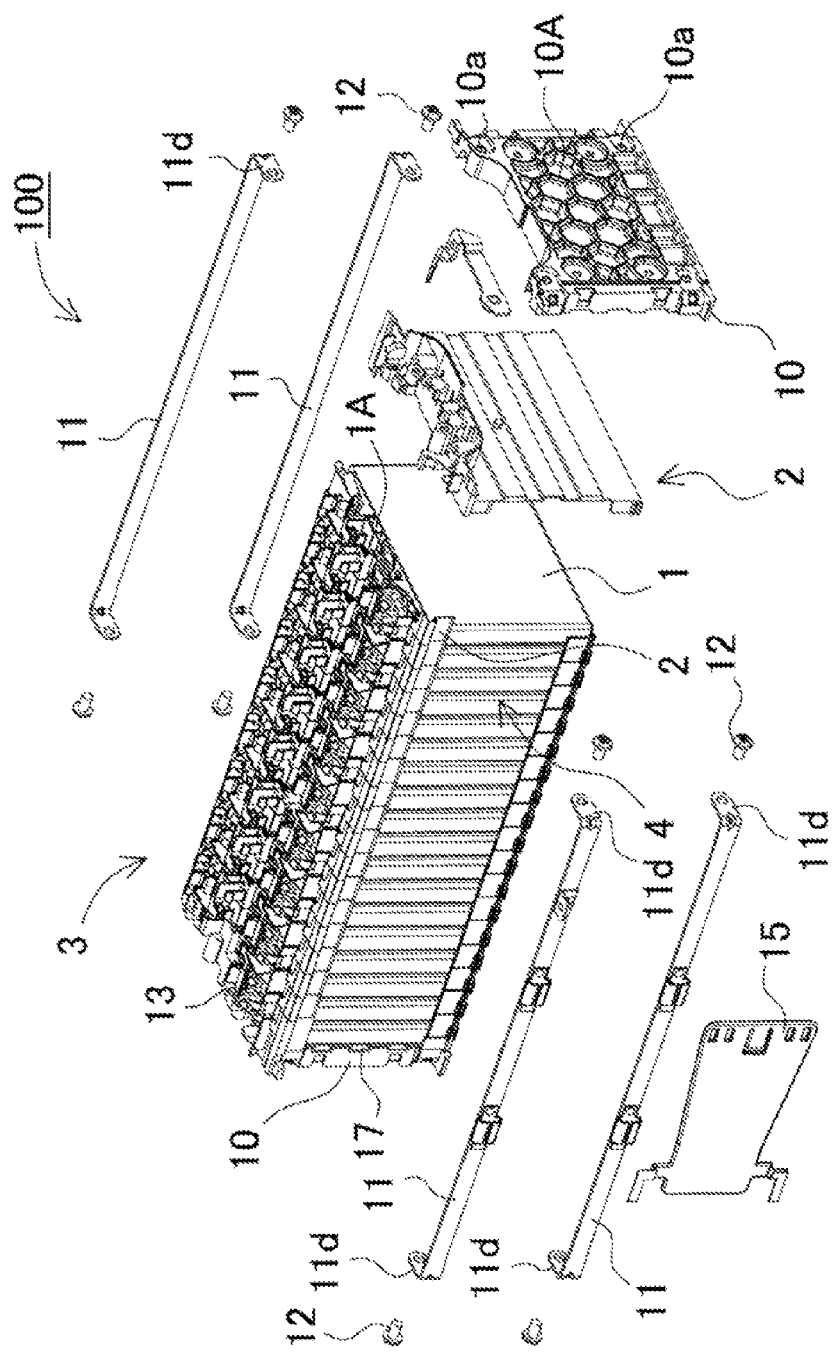
FIG. 6 is an exploded perspective view showing a battery block of the battery system shown in FIG. 2.
Figure 7:
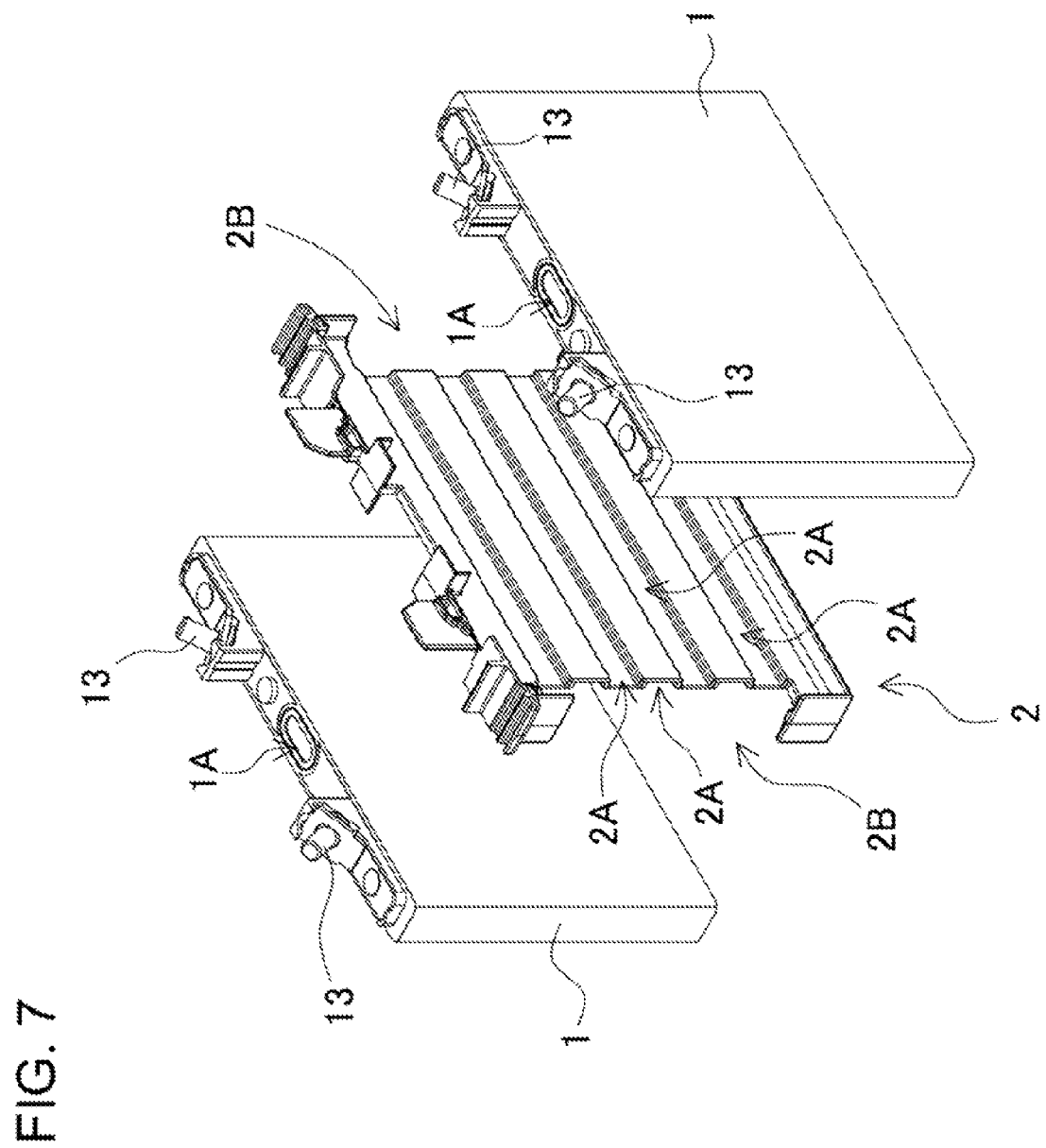
FIG. 7 is an exploded perspective view showing the side-by-side arrangement of battery cells and a separator.
Figure 8:
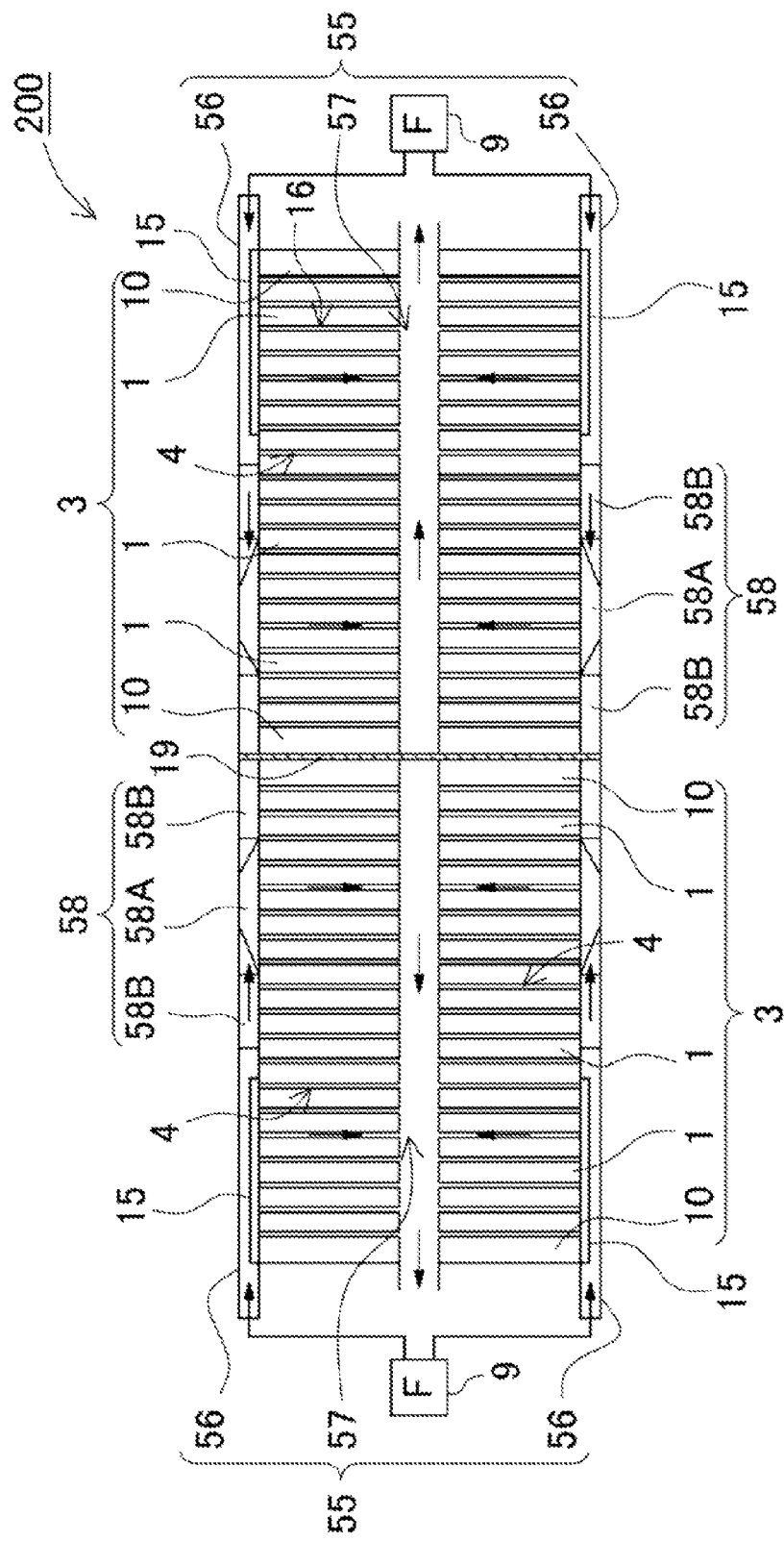
FIG. 8 is a horizontal cross-sectional view schematically showing the battery system according to an embodiment 2.
Figure 9:
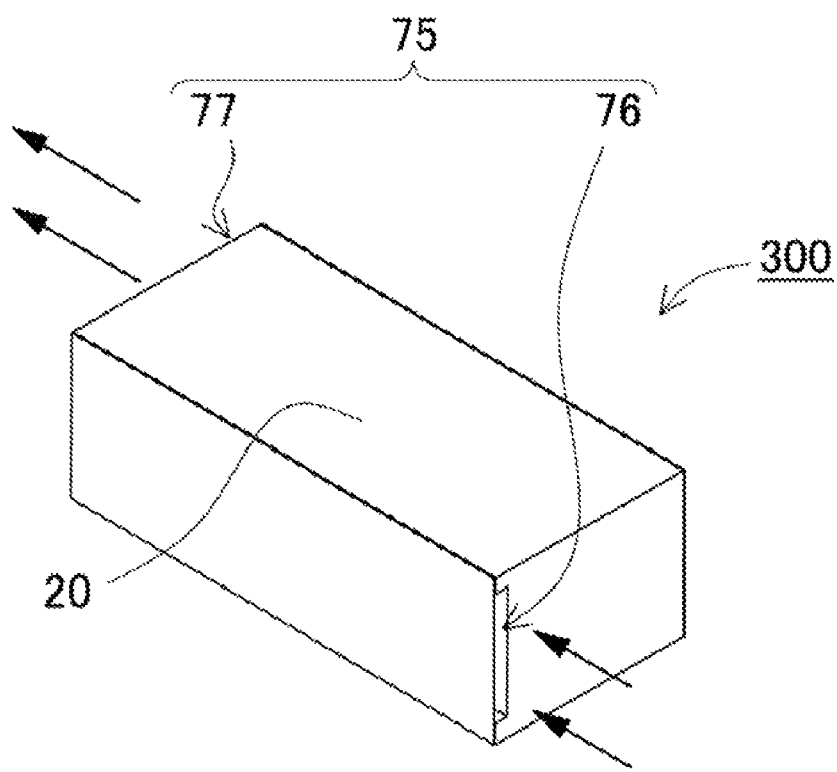
FIG. 9 is a cross-sectional view schematically showing the battery system according to an embodiment 3.

The following description will describe power supply devices according to embodiments of the present invention with reference to FIGS. 1 to 9. In the embodiments, the present invention is applied to a vehicle power supply device. FIGS. 1 to 7 show a power supply device 100 according to an embodiment 1 of the present invention. FIG. 8 shows a power supply device 200 according to an embodiment 2 of the present invention. FIG. 9 shows a power supply device 300 according to an embodiment 3 of the present invention. The illustrated power supply devices are suitable mainly for power supplies of electric vehicles such as hybrid cars that are driven by both an engine and an electric motor, and electric vehicles that are driven only by an electric motor. However, the power supply devices can be used for vehicles other than hybrid cars or electric vehicles, and can be also used for applications other than electric vehicle that require high power.

These illustrated power supply devices includes battery blocks 3, and blower mechanisms 9. Each of the battery blocks 3 includes of a plurality of battery cells 1 of rectangular batteries. The battery cells 1 are arranged side by side to form cooling gaps 4 between the battery cells 1. The blower mechanism 9 forcedly blows cooling gas for cooling the battery cells 1 of the battery block 3. In the battery block 3, separators 2 are interposed between the battery cells 1, which are arranged side by side. The separator 2 has a shape that can define the cooling gaps 4 between the battery cells 1 as shown in FIG. 7. The illustrated separator 2 holds the battery cells 1 by a fit-in structure. Specifically, the battery cells 1 are fitted in the separator 2 on the both surfaces of the separator 2. Thus, adjacent battery cells 1 are arranged side by side without positional deviation by the separator 2 that holds the battery cells 1 by using the fit-in structure.

The battery cells 1 of rectangular batteries 1 are lithium-ion rechargeable batteries. However, the battery cells may be nickel-hydrogen batteries or nickel-cadmium batteries. The battery cell 1 shown in FIG. 7 has a rectangular shape with a predetermined thickness, and includes positive/negative electrode terminals 13 and an opening 1A for a safety valve. The positive/negative electrode terminals 13 protrude from the ends of the upper surface of the battery cell 1. The opening 1A is located in the middle of the upper surface of the battery cell 1. The adjacent electrode terminals 13 of the side-by-side arranged battery cells 1 are serially connected to each other by connectors (not shown). In the power supply device, one of the positive and negative electrode terminals 13 is laid on and thus coupled to the other of the positive and negative electrode terminals 13 so that adjacent battery cells 1 are serially connected to each other. The positive and negative electrode terminals 13 can be serially connected to each other by busbars (not shown). In the case of the power supply device in that adjacent battery cells 1 are serially connected to each other, the output voltage of the power supply device can be high, and as a result the power supply device can provide high power. However, in the power supply device according to the present invention, adjacent battery cells may be connected in parallel to each other. The battery cell 1 includes a metal exterior can. The separator 2 is made of an electrically-insulating material, and interposed between the battery cells 1. Accordingly, it is possible to prevent that a short circuit occurs between the exterior containers of the adjacent battery cells 1. The exterior container of the battery cell may be formed of an electrically-insulating material such as plastic. In this case, since the electrically-insulating exterior containers of the battery cells are not necessarily arranged side by side, the separator may be formed of metal.

The separator 2 is formed of an electrically-insulating material such as plastic, and electrically insulates the adjacent battery cells 1 from each other. The separator 2 is inserted between the battery cells 1 for electrically insulating the battery cells from each other as shown in a perspective view of FIG. 7. Also, the separator 2 serves as a spacer for forming the cooling gap 4 between battery cells 1. Since the battery block 3 includes the separators 2, which are thus arranged side by side and interposed between the battery cells 1, the cooling gaps 4 are formed between the battery cells 1 as shown in a side view of FIG. 4 so that cooling gas flows through the cooling gaps 4 and cools the battery cells 1. The cooling gas can be outside air, air heat-exchanged with coolant, coolant or the like. The separator 2 shown in FIG. 7 has grooves 2A on its surfaces that face the battery cells 1. The grooves 2A extend to the both edges of the separator 2. The cooling gaps 4 are thus formed between the battery cells 1. In the illustrated separator 2, the grooves 2A are arranged in parallel to each other at a predetermined interval. The grooves 2A are formed on the both surfaces of the separator 2 shown in FIG. 7. Thus, the cooling gaps 4 are formed between each of adjacent battery cells 1 and the separator 2. The thus-configured power supply device has a feature that the battery cells 1 on the both sides of the separator can be effectively cooled via the cooling gaps 4, which are formed on the both sides of the separator 2. However, the grooves may be formed only on one side of the separator. In this case, the cooling gaps are formed between the battery cell and the separator. The illustrated cooling gap 4 extends in the horizontal direction, and opens toward the left and right sides of the battery block 3. Also, the separator 2 shown in FIG. 7 has cut-out portions 2B on both edge parts. The width between surfaces of adjacent battery cells 1 opposed to each other can be wide in the cut-out portion 2B on both edge parts of the separator 2 so that cooling gas flow resistance can be small. For this reason, cooling gas can smoothly pass from the cut-out portion 2B through the cooling gaps 4 between the separator 2 and the battery cells 1. Therefore, the battery cells 1 can be effectively cooled. As discussed above, air is forcedly blown through the cooling gaps 4, and efficiently and directly cools the exterior containers of the battery cells 1. The thus-configured power supply device has a feature in that thermal runaway of the battery cell 1 can be effectively prevented and the battery cells 1 can be efficiently cooled.

(End Plate 10)

Figure 4:
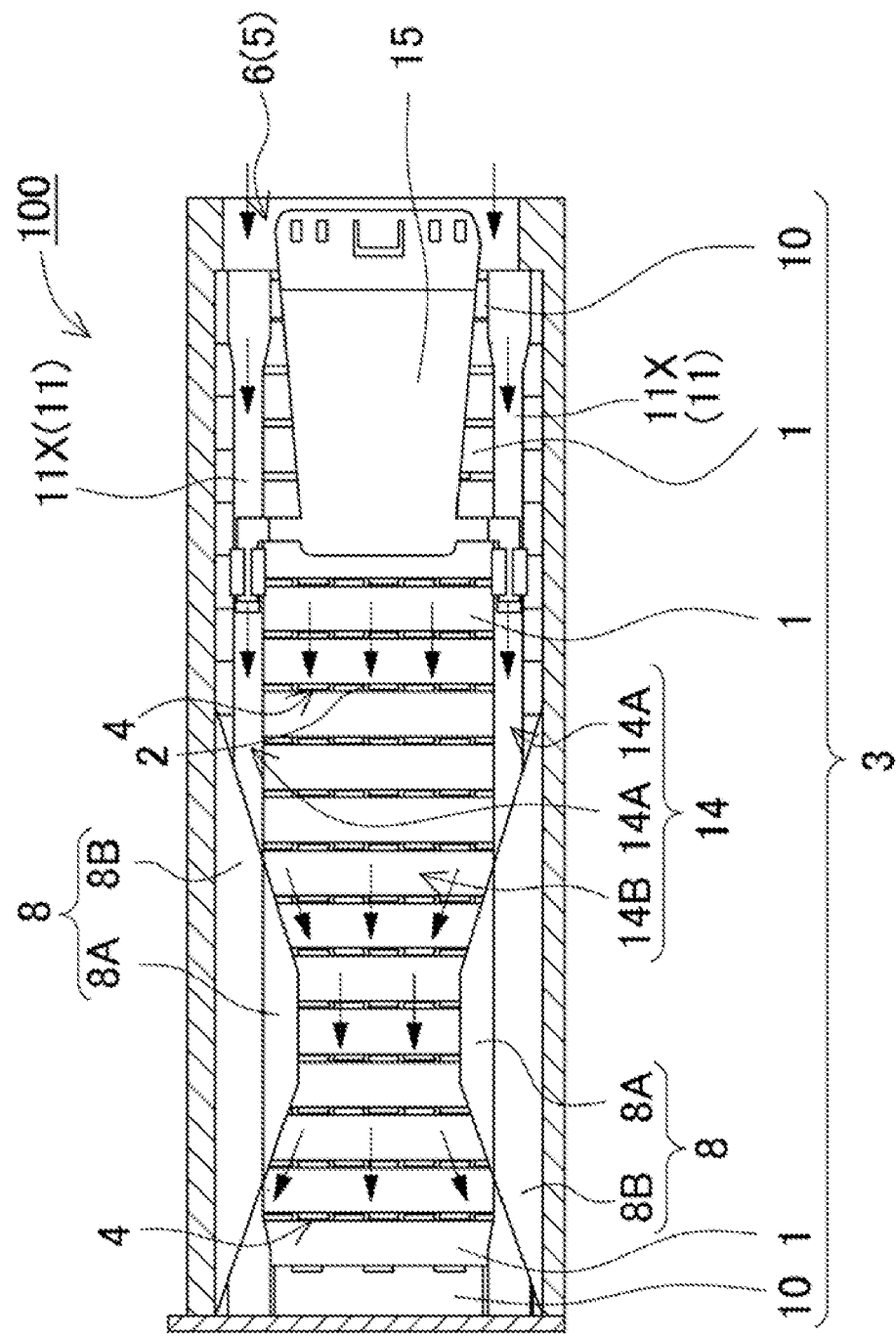
FIG. 4 is a cross-sectional view showing the battery system shown in FIG. 3 taken along the line IV-IV.

As shown in FIG. 4, etc., a pair of end plates 10 are arranged on opposed ends of the battery block 3. The pair of end plates 10 are coupled by coupling members 11 so that the side-by-side arranged battery cells 1 and the separators 2 are secured between the end plates 10. The end plates 10 have a rectangular shape corresponding to the external shape of the battery cell 1. The both ends of the coupling member 11 are bent inward as shown in FIG. 6. These bent portions 11d are secured to the end plates 10 by fastening screws 12. Although not illustrated, the bent portions of the coupling members may extend so as to surround the entire length of each of the end plates, and may be secured to the end plates by the fastening screws. Alternatively, threaded holes may be formed on the side surface of the end plate. In this case, the coupling members are secured to the end plates by fastening screws that penetrate the coupling members. Thus, these coupling members to be secured to the outer side surfaces of the end plates do not have the bent portions, but are farmed in a straight shape and secured to the end plates.

The end plate 10 shown in FIG. 6 is formed of metal. The end plate 10 includes reinforcing ribs 10A that are integrally formed with the outside of the end plate 10 whereby reinforcing the end plate 10. The metal end plate 10 has sufficient strength, and can bear coupling torque of the fastening screws 12. The coupling recessed portions 10a are formed on the outside surface of the end plate 10, and receive the bent portions 11d of the coupling members 11. The end plate 10 shown in FIG. 6 has four coupling recessed portions 10a on the outside surface at the four-corner parts. The coupling holes 10a are threaded holes. The fastening screws 12 pass through the coupling members 11, and are screwed into the threaded holes. Thus, the coupling members 11 can be secured to the end plates 10. However, the end plate is not limited to metal. The end plate may be formed of resin, which is advantageous from the viewpoint of ease of molding, electrically insulation property, and the like.

(Coupling Member 11)

Bind bars 11X corresponds to the coupling members 11. The bind bars 11X have a predetermined vertical width. The bind bar 11X as the coupling member 11 is a metal plate with a predetermined vertical width. The both ends of the bind bars 11X as the coupling members 11 are secured to the four corner parts of the end plates 10. The bind bars 11X are arranged in parallel to each other on the upper and lower parts of the both sides of the battery cells 1. In the battery block 3 with the bind bars 11X being secured to the upper and lower part of both sides, as shown in FIG. 4, some of the cooling gaps 4 arranged between the battery cells 1 in the upper and lower parts of will be closed by the bind bars 11X. That is, if a cooling gap 4 is closed by the bind bar 11X, cooling gas does not flow into the closed cooling gap 4 though an opening 14 of the closed cooling gap 4. The cooling gaps 4 have openings 14 that open on the both sides of the battery cells 1. The entire openings 14 can be divided into closed portions 14A and exposed portions 14B. The closed portions 14A are located on the upper and lower parts, and are closed by the bind bars 11X. The openings 14 in the exposed portion 14B are not closed by the bind bars 11X. The exposed portion 14B is formed between the closed portions 14A on the upper and lower parts, and communicates with an air duct 5. The exposed portion 14B communicates with an inlet duct 6. The cooling gas is forcedly blown into the exposed portion 14B through the inlet duct 6. The bind bars 11X are arranged on the upper and lower parts of the both side surfaces of the battery block 3. As a result, the entire cooling gaps 4 can be divided into the upper and lower closed portions 14A, and the exposed portion 14B. An exposed portion 14B on one side communicates with the inlet duct 6, while an exposed portion 14B on the other side communicates with the outlet duct 7. Thus, the battery cells 1 are cooled by the cooling gas.

Figure 1:
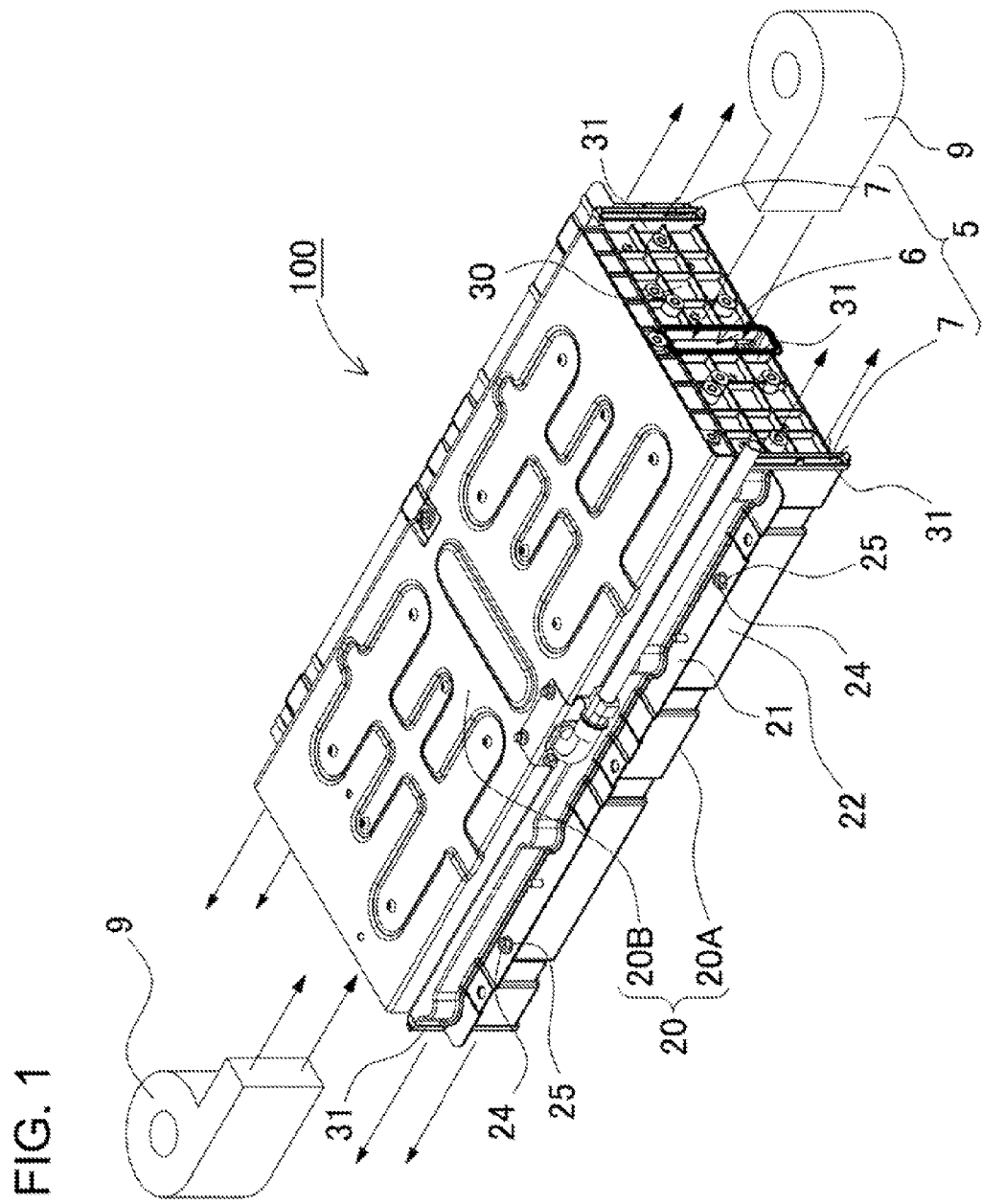
FIG. 1 is a perspective view of a battery system according to an embodiment of the present invention.
Figure 2:
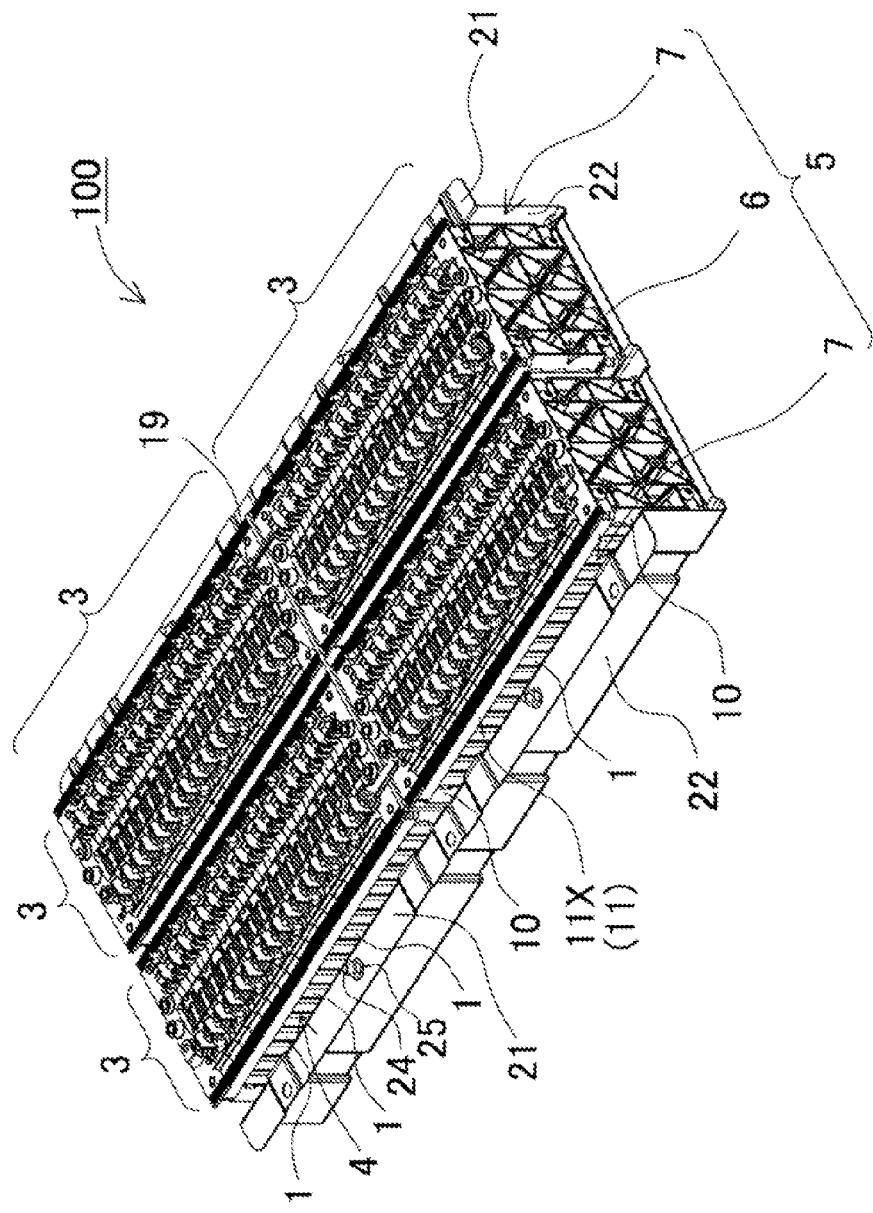
FIG. 2 is a perspective view showing the internal structure of the battery system shown in FIG. 1.
Figure 3:
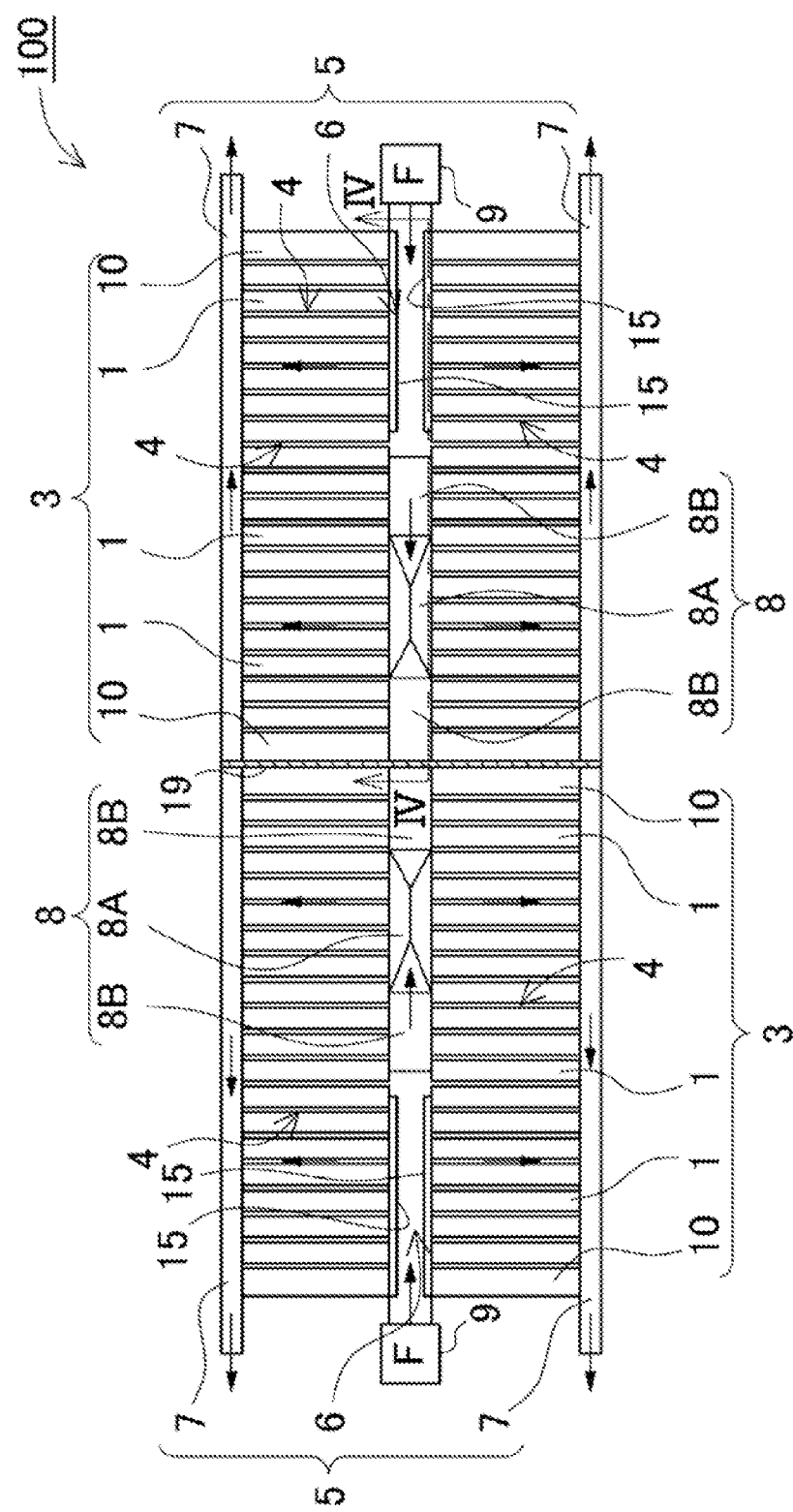
FIG. 3 is a horizontal cross-sectional view schematically showing the battery system shown in FIG. 2.
Figure 5:
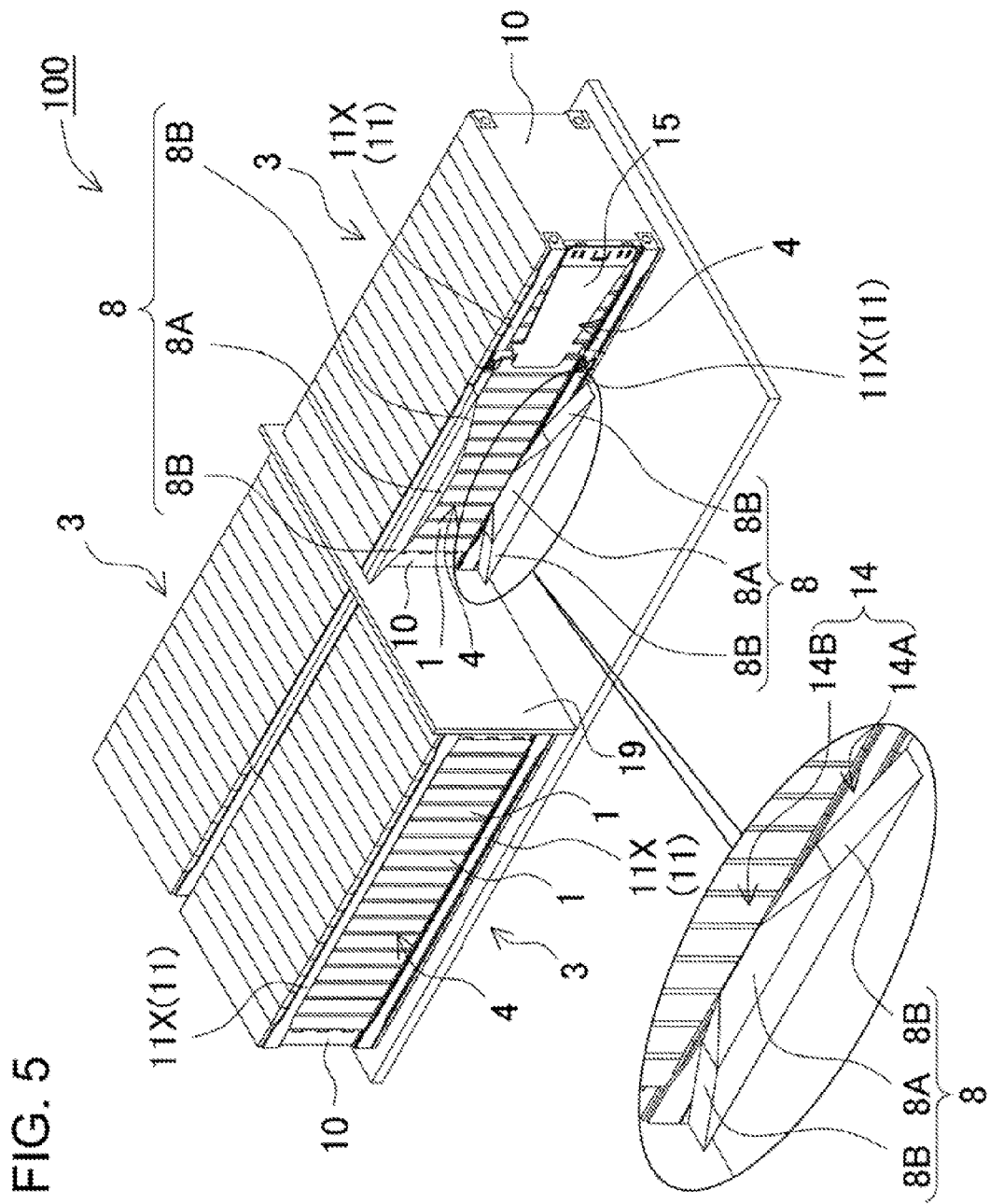
FIG. 5 is a perspective view schematically showing the internal structure of the battery system shown in FIG. 1 with a part of the battery system being enlarged.

The thus-configured battery blocks 3 are arranged in two rows as shown in FIGS. 2, 3 and 5. The air ducts 5 are arranged in a part between the two rows of battery blocks 3, and parts outside the two rows of battery blocks 3. Specifically, the inlet duct 6 is arranged in the part between the two rows of battery blocks 3, and communicates with cooling gaps 4. The outlet ducts 7 are arranged in parts outside the two rows of battery blocks 3 so that the cooling gaps 4 are arranged in parallel to each other between each of the outlet ducts 7 and the inlet duct 6 and communicate with each other. In this power supply device, as shown by arrows in FIGS. 1 and 3, cooling gas is forcedly blown from the inlet duct 6 toward the outlet ducts 7 by the blower mechanisms 9 to cool the battery cells 1. The cooling gas is forcedly blown from the inlet duct 6 toward the outlet ducts 7, and is then branched from the inlet duct 6. Thus, the cooling gas flows in the cooling gaps 4 to cool the battery cells 1. After cooling the battery cells 1, the cooling gas flows merge into the outlet duct 7. After that, the merging cooling gas is discharged.

(Embodiment 2)

In the aforementioned power supply device has been described that includes the inlet duct arranged between the battery blocks arranged in parallel to each other, and the outlet ducts arranged outside the battery blocks so that cooling gas is blown from the central part to the outside parts of the power supply device. However, the construction for blowing cooling gas to the battery block is not limited to this construction. For example, the inlet ducts can be arranged outside the battery blocks, while outlet duct can be arranged between the battery blocks so that cooling gas is blown from the outside parts to the central part of the power supply device. FIG. 8 shows this type of power supply device as an embodiment 2. In the power supply device 200 according to the embodiment 2 shown in FIG. 8, inlet ducts 56 are arranged in parts outside the two rows of battery blocks 3, and an outlet duct 57 is arranged in the part between the two rows of battery blocks 3 and communicates with cooling gaps 4. In this power supply device 200, as shown by arrows in FIG. 8, cooling gas is forcedly blown from the inlet ducts 56 arranged in parts outside the power supply device 200 toward the outlet duct 57 arranged in the central part of the power supply device 200 by the blower mechanism 9 to cool the battery cells 1. The cooling gas is forcedly blown from the inlet ducts 56 arranged outside, and then cooling gas flows pass through the cooling gaps 4 to cool the battery cells 1. After cooling the battery cells 1, cooling gas flows merge into the outlet duct 57 arranged in the central part of the power supply device. After that, the merging cooling gas is discharged.

Each of the power supply devices shown FIGS. 1 to 3 and FIG. 8 includes four battery blocks 3. The four battery blocks 3 are arranged in two columns and two rows. Two battery blocks 3 that compose each column are arranged in parallel to each other in two rows so that the air ducts 5 or 55 are arranged in the central part and the outside parts of the power supply device. In addition, in the illustrated power supply device, two sets of the thus-arranged parallel two battery blocks 3 are arranged in two columns. That is, as shown in FIG. 5, a center barrier wall 19 is arranged between the two sets of battery blocks 3 that compose adjacent columns so that two sets of air ducts 5 or 55, which are arranged in the central part and the outside parts of the power supply device in two columns of battery blocks 3, are cut off from each other. Accordingly, in the power supply devices, cooling gas is provided to the battery blocks 3 in each column through the separated inlet ducts 6 or 56, as shown in FIG. 3 and FIG. 8, and the cooling gas is forcedly blown into the cooling gaps 4 and is then discharged through the separates outlet ducts 7 or 57. In the illustrated power supply devices, cooling gas is forcedly blown from the inlet ducts 6 and 56 to the outlet ducts 7 and 57 in opposite directions, and cools the battery cells 1.

The aforementioned power supply devices include four battery blocks 3, which are arranged in two columns and two rows. Two battery blocks 3 are arranged in parallel to each other in each of two rows. However, the power supply device can include only two battery blocks that are arranged in parallel to each other in two rows. That is, battery blocks can be arranged in one column and two rows. In this illustrated power supply devices, cooling gas can be forcedly blown between the inlet and outlet ducts in either direction, and can cool the battery cells 1. In the case where four battery blocks arranged in two columns and two rows, the center barrier wall may not be provided between the battery blocks in two columns and the between air ducts in two columns but a set of two battery blocks adjacent to each other in the row direction may be aligned in straight. In this case, two sets of the thus-aligned battery blocks may be arranged in parallel to each other in two rows so that the air ducts are arranged inside and outside. In this power supply device, the inlet duct(s) can be one of the fun duct arranged inside and a pair of the fun ducts arranged outside in the battery blocks, which are arranged in two columns and two rows, while the outlet duct(s) can be the other so that cooling gas forcedly blown from the inlet duct(s) is led to the cooling gaps and is discharged through the outlet duct(s). Also, in this power supply devices, cooling gas can be forcedly blown between the inlet and outlet ducts in either direction, and can cool the battery cells.

The area of the air ducts 5 arranged between battery blocks 3 arranged in parallel to each other in two rows is twice the area of the air ducts 5 arranged outside the battery blocks 3 in two rows. The reason is that cooling gas forcedly blown through the inlet duct 6 arranged between two battery blocks 3 is branched into two flows, and the branched cooling gas flows are discharged through the outlet ducts 7 arranged on the both sides in the power supply device shown in FIGS. 1 to 3. Also, cooling gas forcedly blown through the inlet ducts 56 arranged on the both sides is discharged through the outlet ducts 57 arranged between two battery blocks 3 in the power supply device shown in FIG. 8. That is, in the power supply device shown in FIGS. 1 to 3, since the inlet duct 6 passes cooling gas twice as much as the outlet ducts 7 on the both sides, the inlet duct 6 is required to have a cross-sectional area twice as large as the outlet ducts 7 in order to reduce pressure loss. In the power supply device shown in FIG. 3, in order that the inlet duct 6 as the air duct 5 arranged in the central part of the power supply device can have a larger cross-sectional area, the width of the inlet duct 6 is designed twice as large as the width of the outlet duct 7. Also, in the power supply device shown in FIG. 8, since the outlet duct 57 arranged in the central part of the power supply device passes cooling gas twice as much as the inlet ducts 56 on the both sides, the outlet duct 57 is required to have a cross-sectional area twice as large as the inlet ducts 57 in order to reduce pressure loss. Also, in order that the outlet duct 57 as the air duct 55 arranged in the central part of the power supply device can have a larger cross-sectional area, the width of the outlet duct 57 is designed twice as large as the width of the inlet duct 56.

(Embodiment 3)

The aforementioned power supply device has been described that includes the battery blocks 3, which are arranged in parallel to each other in two rows, and the air ducts 5 and 55, which are arranged in a part between the two rows of battery blocks 3 and in parts outside the two rows of battery blocks 3. However, the power supply device can be composed of one row of battery blocks. In the power supply device 300 according to an embodiment 3 shown in FIG. 9, two air ducts 75 are arranged on the both sides of one row of battery blocks 3. One of the two air ducts 75 serves as an inlet duct 76, while the other of the two air ducts 75 serves as an outlet duct 77. In this power supply device 300, as shown by arrows in FIG. 9, cooling gas is forcedly blown from the inlet duct 76 toward the outlet ducts 77 by the blower mechanism 9 to cool the battery cells 1. The cooling gas is forcedly blown from the inlet ducts 76, and then cooling gas flows pass through the cooling gaps 4 to cool the battery cells 1. After cooling the battery cells 1, the cooling gas flows merge into the outlet duct 77. After that, the merging cooling gas is discharged. Since the cooling gas flow rates in the inlet and outlet ducts 76 and 77 are equal to each other in this power supply device 300, the inlet and outlet ducts 76 and 77 arranged on the both sides are designed to have the same cross-sectional area, that is, the widths of the inlet and outlet ducts 76 and 77 are dimensioned equal to each other.

(Temperature Equalizing Plate 15)

In the power supply devices 100, 200 and 300, a temperature equalizing plate 15 can be attached onto a part of a side surface of the battery block 3. The temperature equalizing plate 15 is arranged so as to partially close some of the cooling gaps 4 so that the limitation amount on battery cell 1 cooling performance gets larger toward the upstream side. According to this construction, the temperature equalizing plate interferes with cooling gas flowing into the some of the cooling gaps 4. As a result, the flow rate of the cooling gas is regulated. The closing amount of cooling gap 4 by the temperature equalizing plate gets smaller toward the cooling gas flowing direction. According this construction, the temperature difference among the battery cells 1 can be reduced. The battery block 3 shown in FIGS. 4 to 6 is provided with a temperature equalizing plate 15 the vertical width of which gets larger toward the end of the battery block 3, i.e., toward the upstream side.

Figure 10:
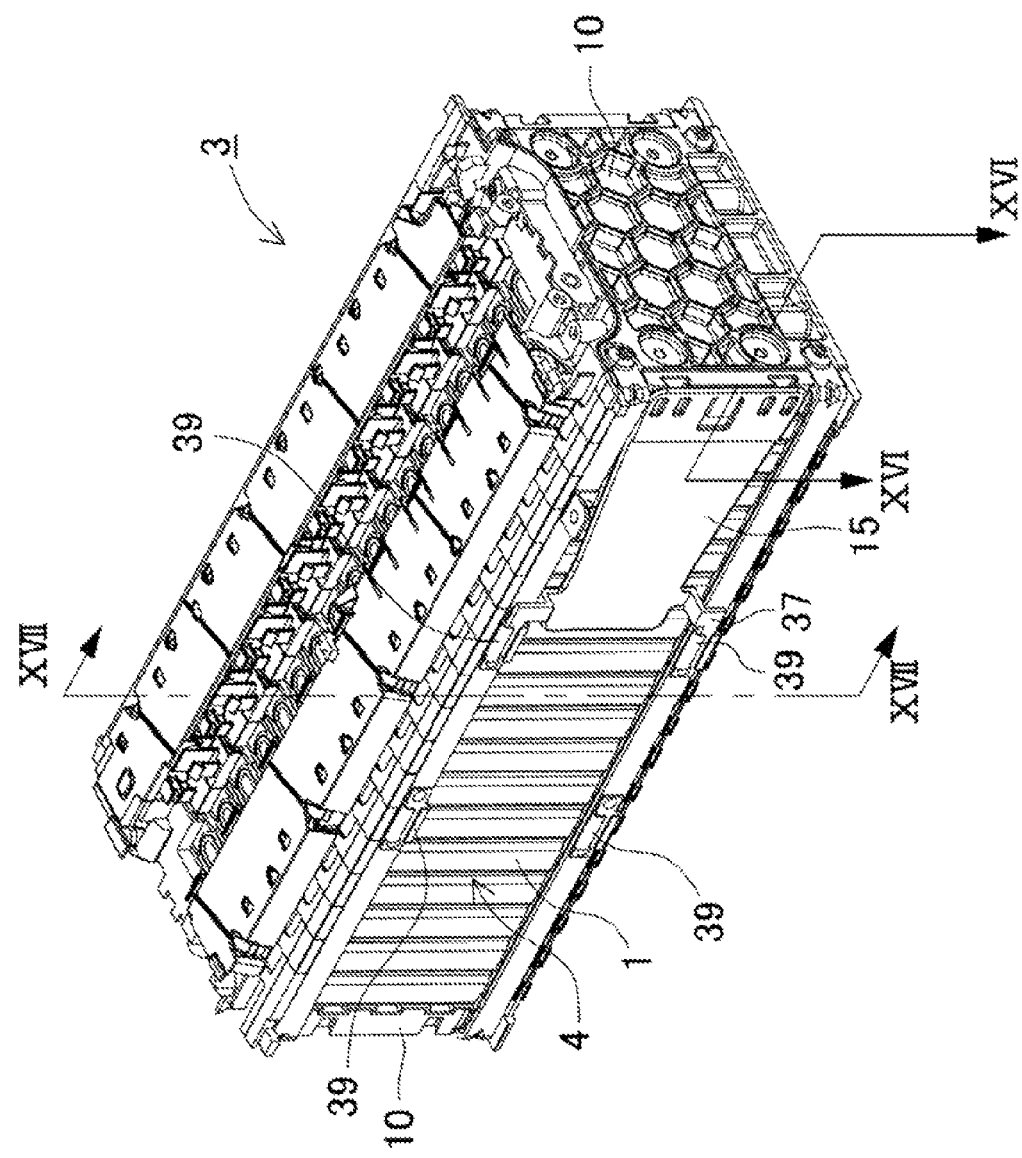
FIG. 10 is a perspective view showing a battery block with a temperature equalizing plate being fastened to the battery block.
Figure 11:
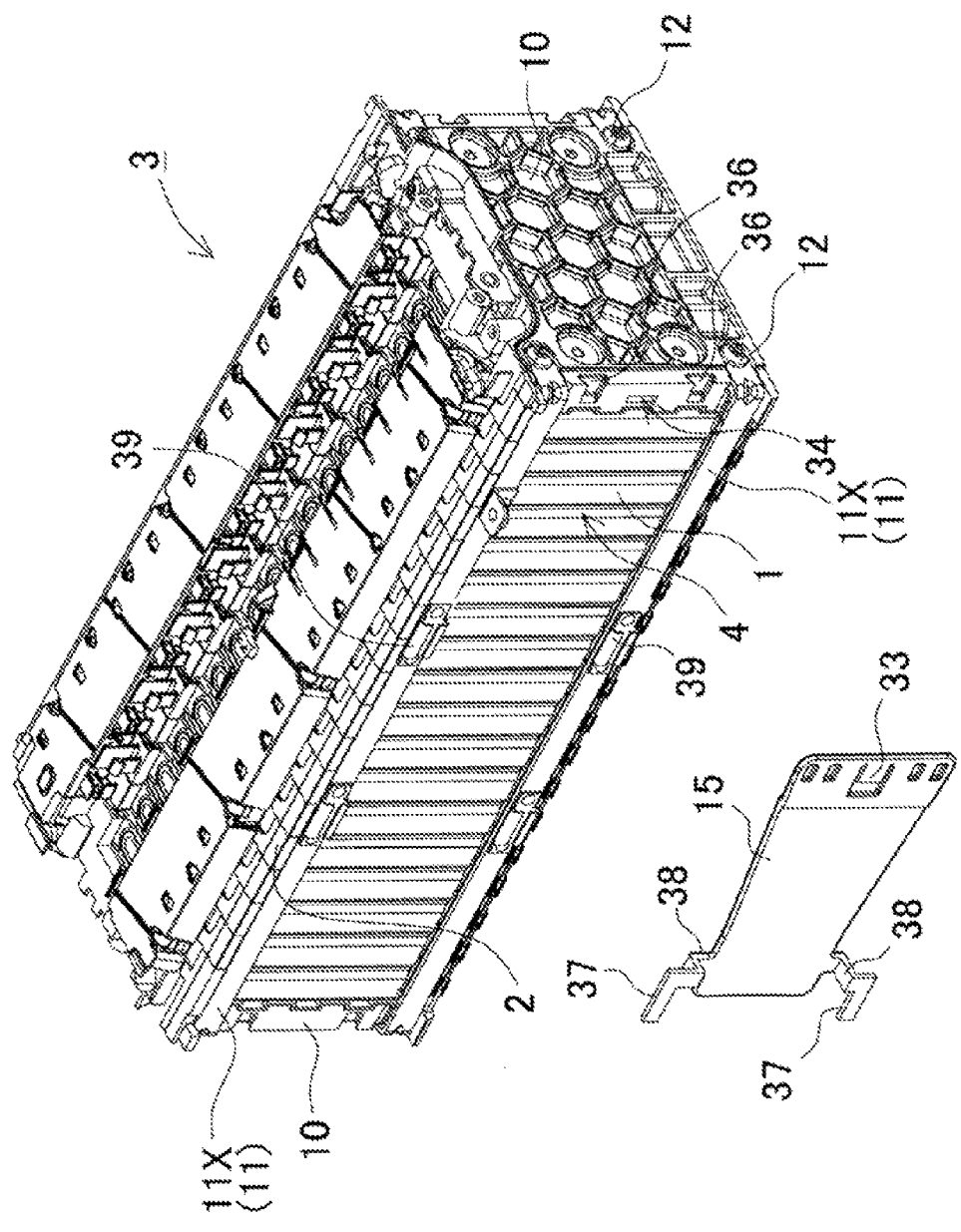
FIG. 11 is an exploded perspective view showing the battery block with the temperature equalizing plate being removed from the battery block shown in FIG. 10.
Figure 12:
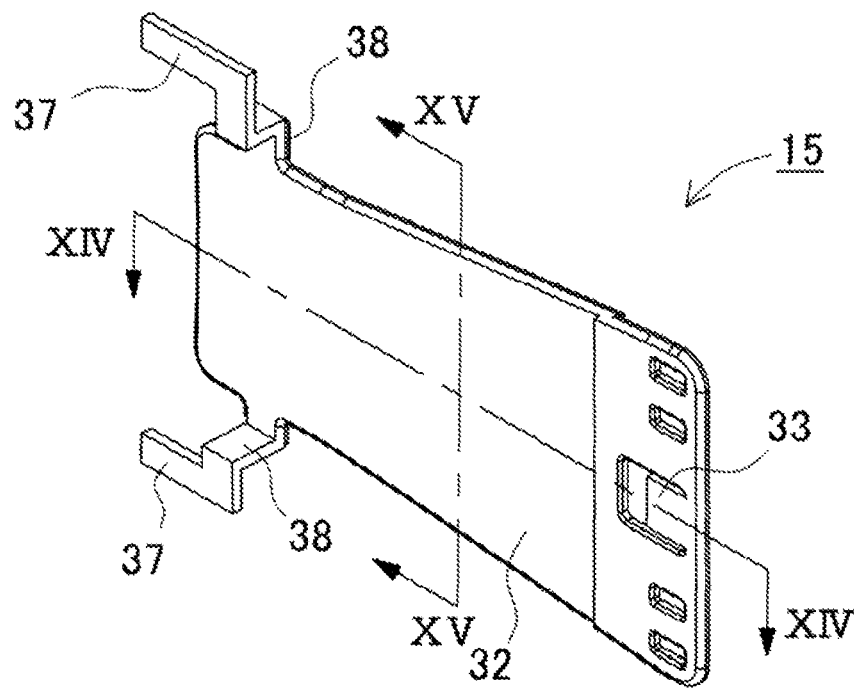
FIG. 12 is a perspective view showing the temperature equalizing plate shown in FIG. 11.
Figure 13:
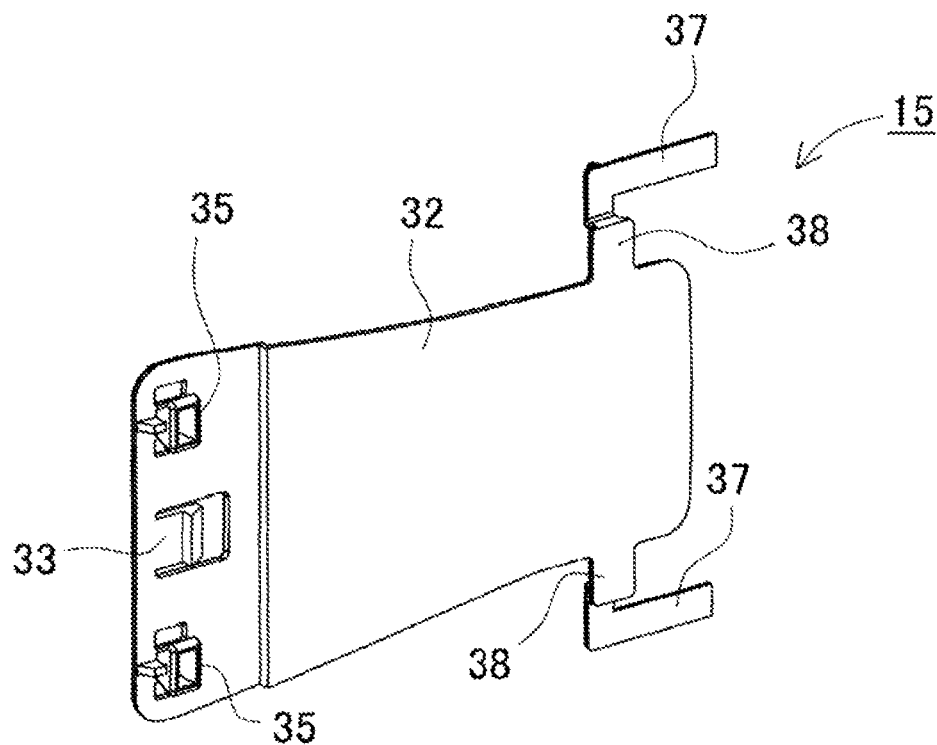
FIG. 13 is a perspective view showing the temperature equalizing plate shown in FIG. 12 as viewed from the back side.
Figure 14:
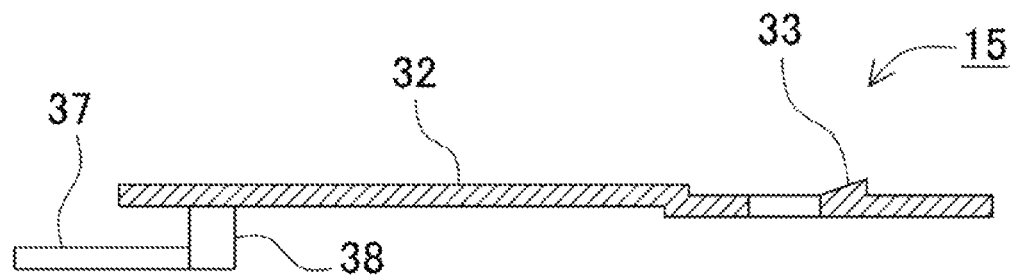
FIG. 14 is a traverse sectional view of the temperature equalizing plate shown in FIG. 12 taken along the line XIV-XIV.
Figure 15:
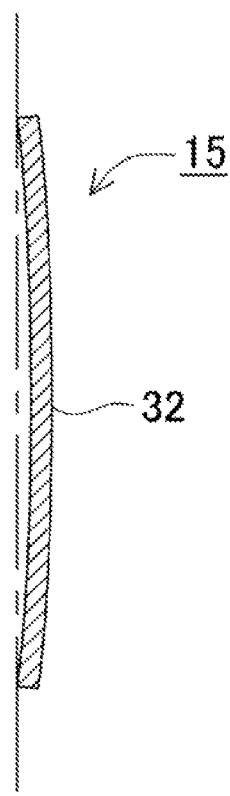
FIG. 15 is a longitudinal sectional view of the temperature equalizing plate shown in FIG. 12 taken along the line XV-XV.
Figure 16:
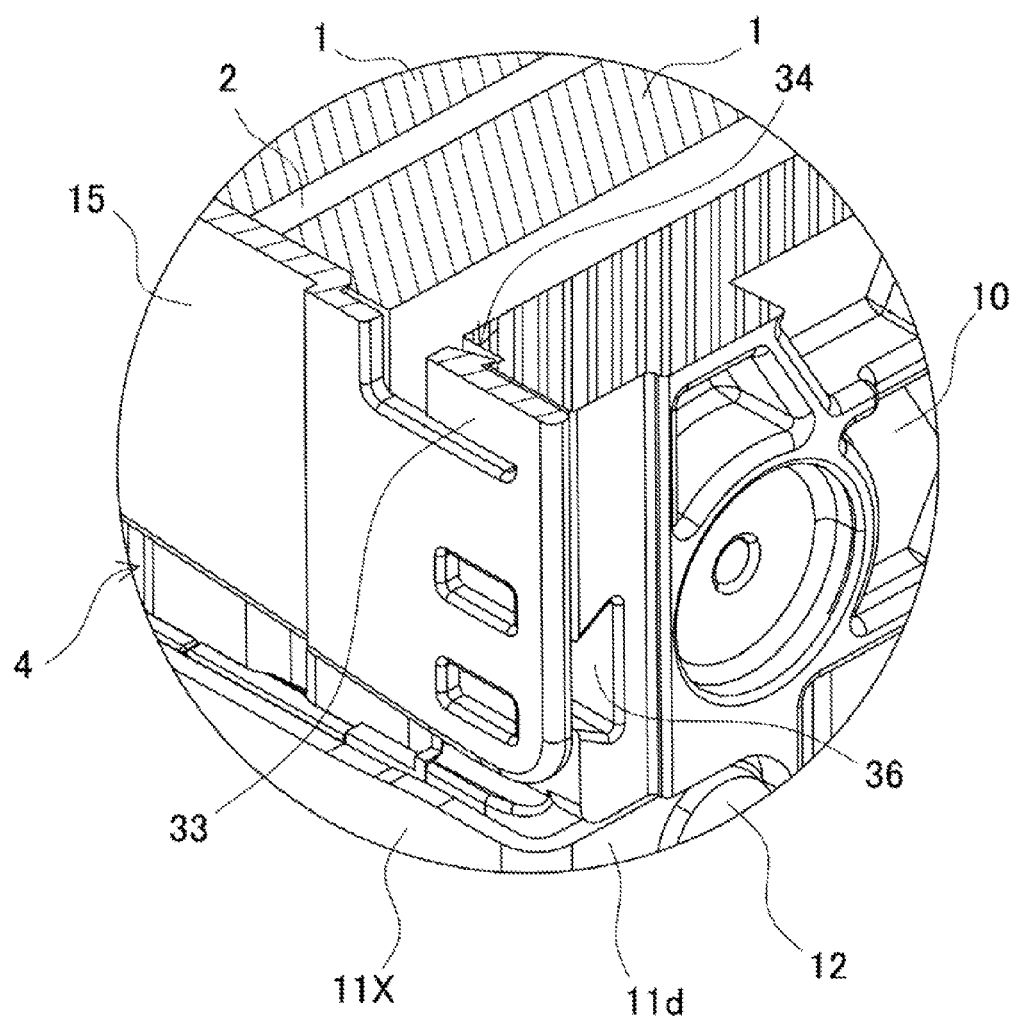
FIG. 16 is a partially horizontally sectional perspective view of the battery block shown in FIG. 10 taken along the line XVI-XVI.
Figure 17:
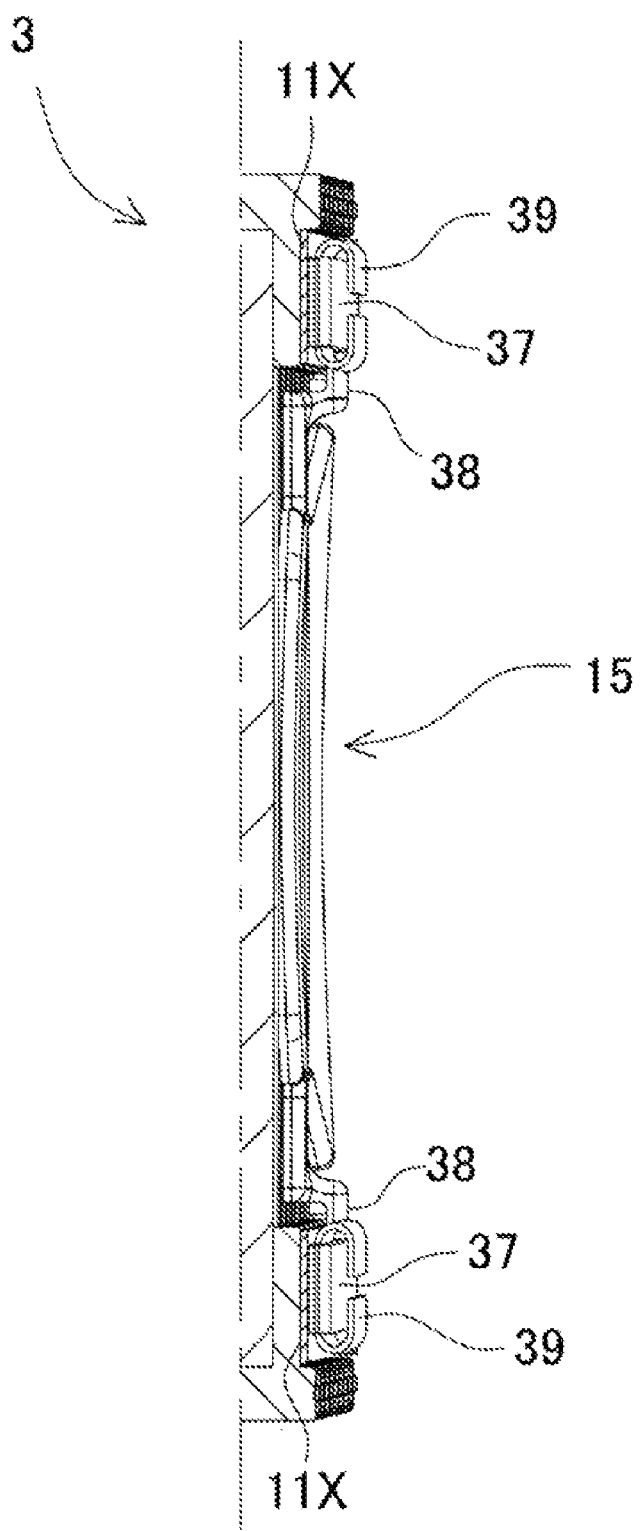
FIG. 17 is a vertically sectional perspective view of the battery block shown in FIG. 10 taken along the line XVII-XVII.
Figure 18:
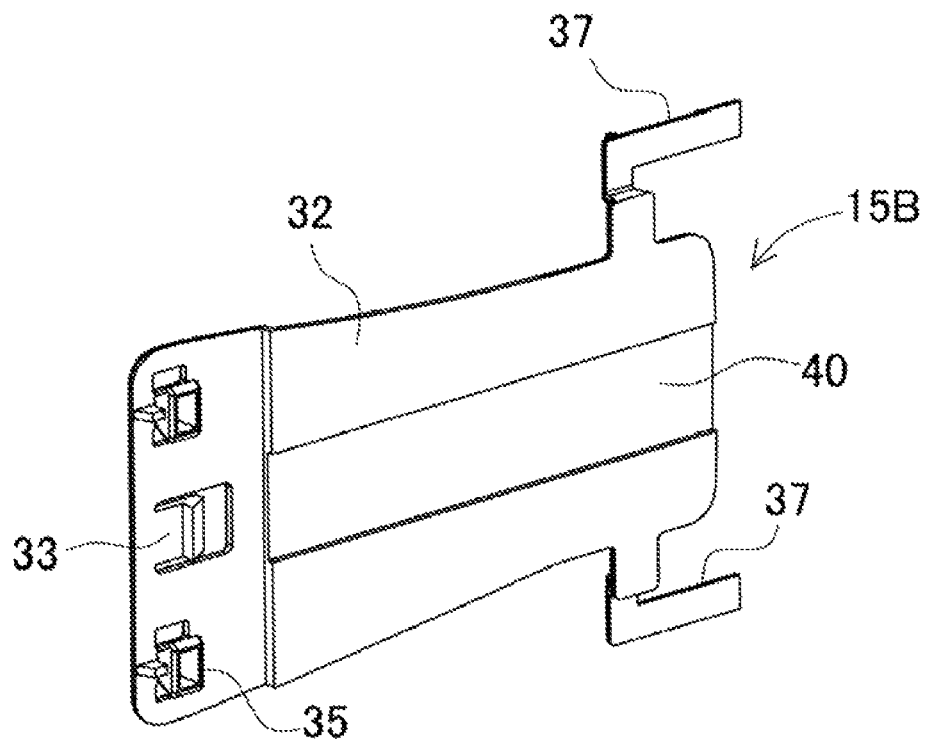
FIG. 18 is a perspective view showing a temperature equalizing plate according to a modified embodiment as viewed from the back surface side.
Figure 19:
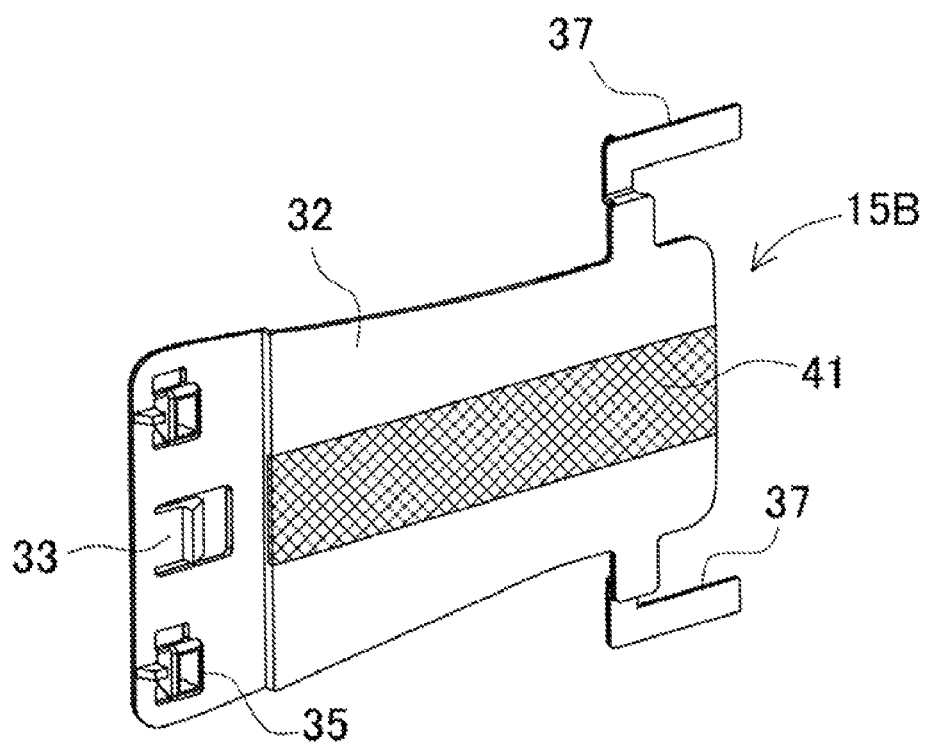
FIG. 19 is a perspective view showing the temperature equalizing plate shown in FIG. 18 with an elastic member being secured onto the temperature equalizing plate.
Figure 20:
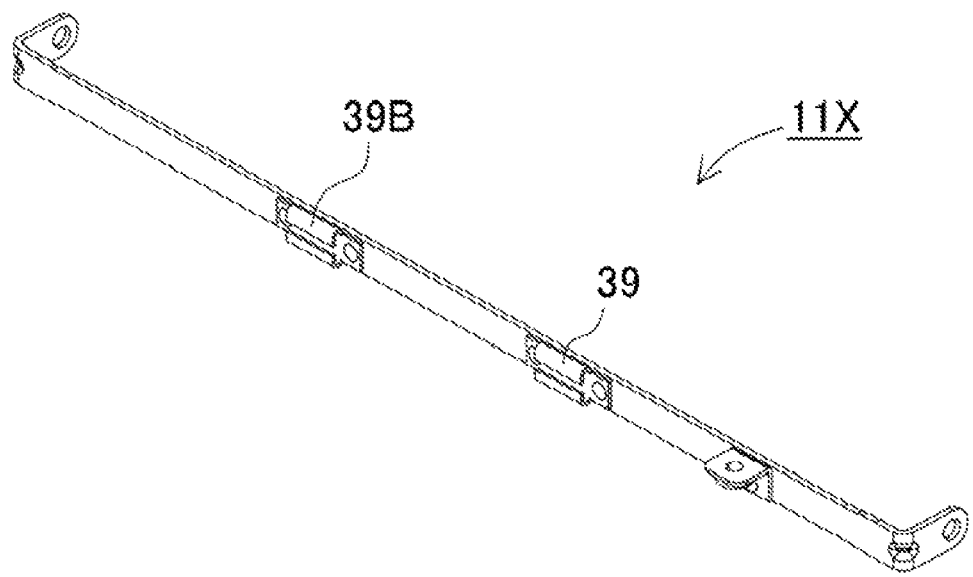
FIG. 20 is a perspective view showing a bind bar shown in FIG. 11.
Figure 21:
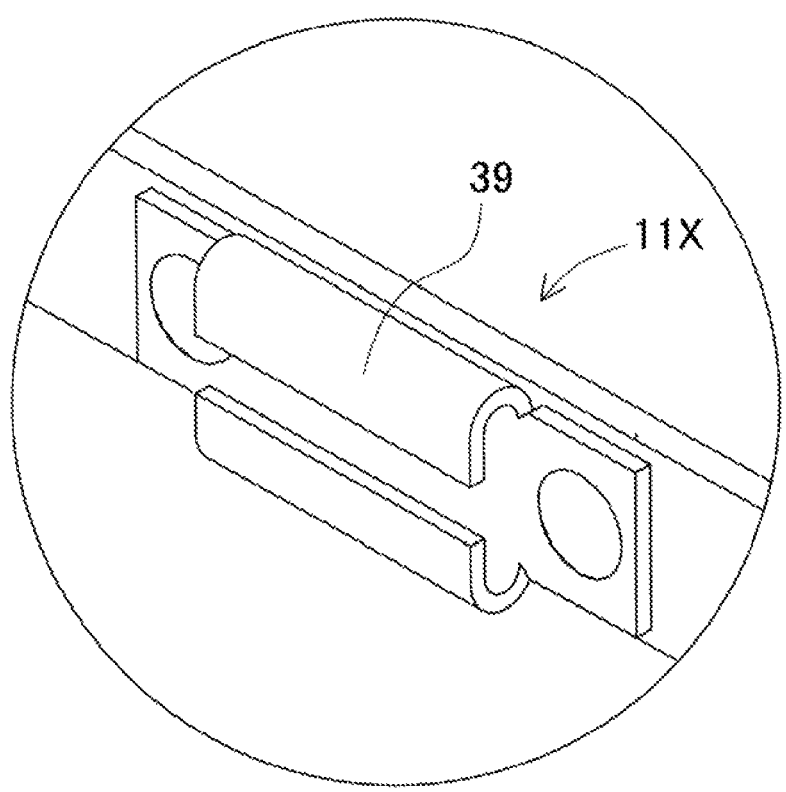
FIG. 21 is an enlarged perspective view showing a protrusion insertion portion of the bind bar shown in FIG. 20.
Figure 22:
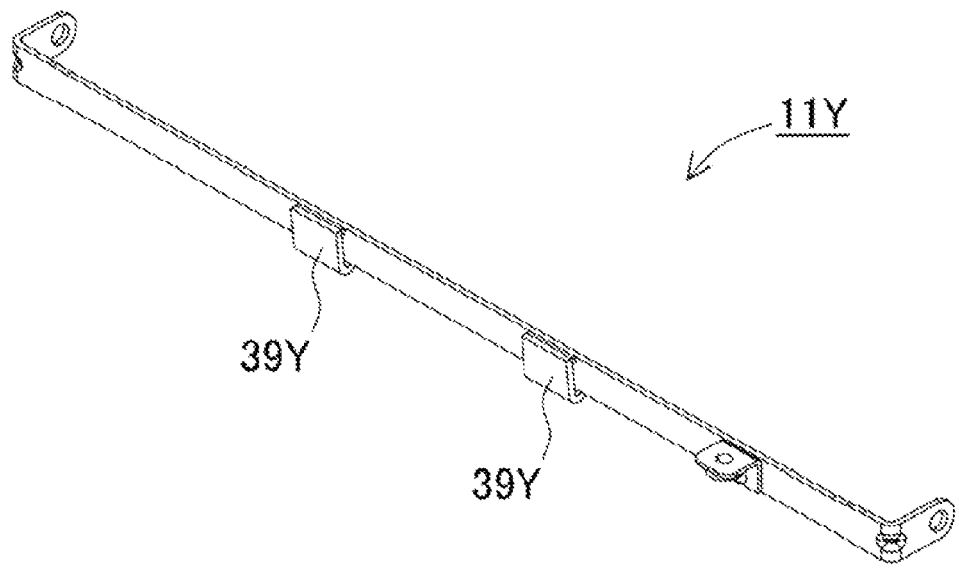
FIG. 22 is a perspective view showing a bind bar according to a modified embodiment.
Figure 23:
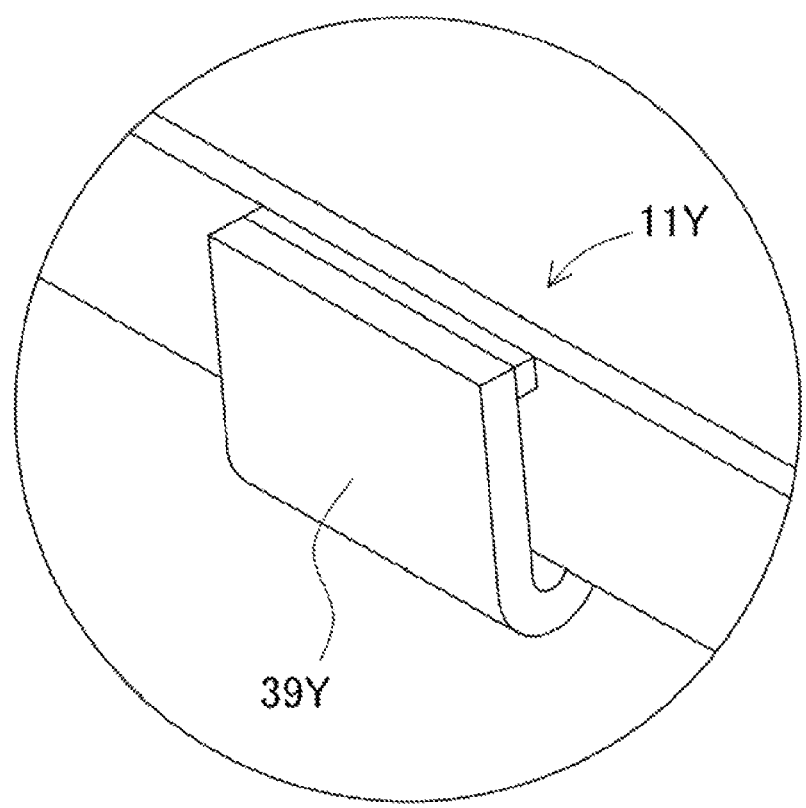
FIG. 23 is an enlarged perspective view showing a protrusion insertion portion of the bind bar shown in FIG. 22.
Figure 24:
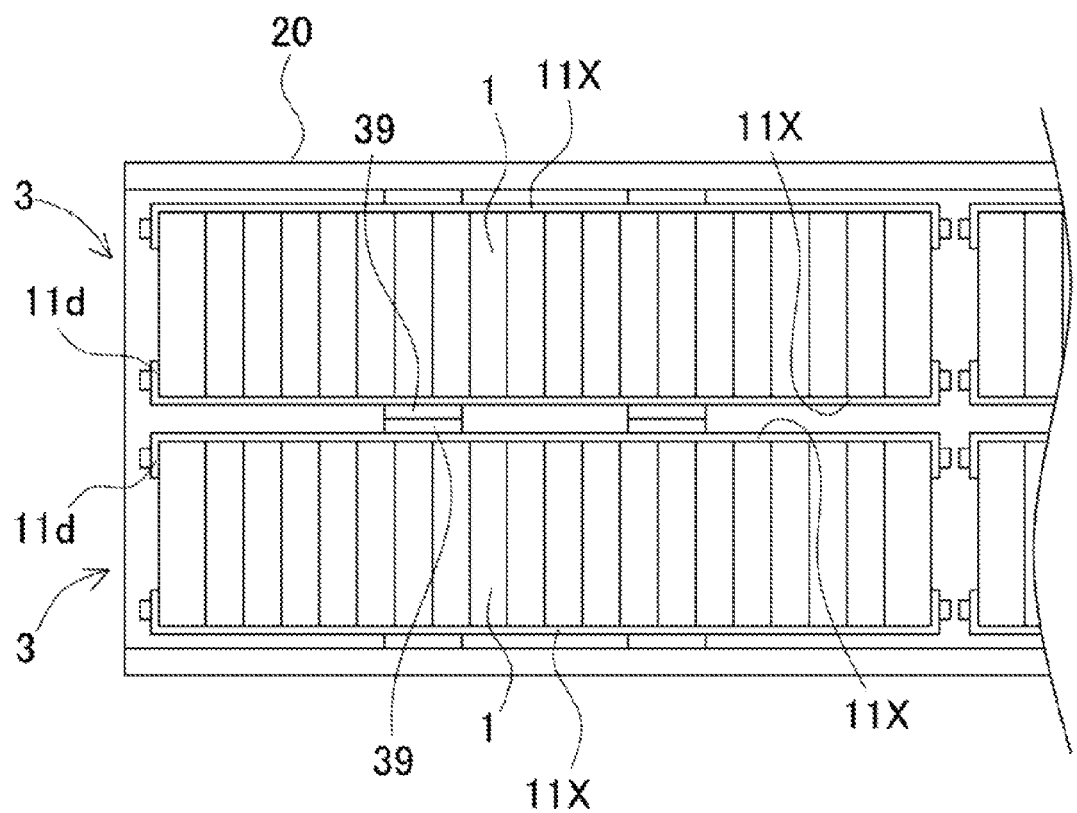
FIG. 24 is a plan view showing battery blocks that are arranged in parallel to each other with protrusion insertion portions of bind bars contacting each other.

Temperature equalizing plates 15 and their attachment structures are now described with reference to FIGS. 10 to 24. FIG. 10 is a perspective view showing the battery block 3 with the temperature equalizing plate 15 being fastened to the battery block 3. FIG. 11 is an exploded perspective view showing the battery block with the temperature equalizing plate being removed from the battery block shown in FIG. 10. FIG. 12 is a perspective view showing the temperature equalizing plate 15 shown in FIG. 11. FIG. 13 is a perspective view showing the temperature equalizing plate 15 shown in FIG. 12 as viewed from the back side. FIG. 14 is a traverse sectional view of the temperature equalizing plate 15 shown in FIG. 12 taken along the line XIV-XIV. FIG. 15 is a longitudinal sectional view of the temperature equalizing plate 15 shown in FIG. 12 taken along the line XV-XV. FIG. 16 is a partially horizontally sectional perspective view of the battery block shown in FIG. 10 taken along the line XVI-XVI. FIG. 17 is a vertically sectional perspective view of the battery block shown in FIG. 10 taken along the line XVII-XVII. FIG. 18 is a perspective view showing a temperature equalizing plate 15B according to a modified embodiment as viewed from the back surface side. FIG. 19 is a perspective view showing the temperature equalizing plate 15B shown in FIG. 18 with an elastic member 41 being secured onto the temperature equalizing plate 15B. FIG. 20 is a perspective view showing a bind bar 11X. FIG. 21 is an enlarged perspective view showing a protrusion insertion portion 39 of the bind bar 11X shown in FIG. 20. FIG. 22 is a perspective view showing a bind bar 11Y according to a modified embodiment. FIG. 23 is an enlarged perspective view showing a protrusion insertion portion 39 of the bind bar 11Y shown in FIG. 22. FIG. 24 is a plan view showing battery blocks 3 that are arranged in parallel to each other with protrusion insertion portions 39 of bind bars 11X contacting each other.

The temperature equalizing plate 15 is arranged on the cooling gas flowing path, and serves as a baffle for interfering with the cooling gas flow. The temperature equalizing plate 15 includes a main plate portion 32 that has an isosceles trapezoid as shown in the perspective view of FIGS. 12 and 13. An interlocking hook 33 is arranged at the center of the wider width part of the main plate portion 32. Also, attachment protrusions 37 are arranged at the upper and lower ends of the narrower width part of the main plate portion 32. When the temperature equalizing plate 15 is attached onto the side surface of the battery block 3 as shown in FIGS. 10 and 11, the opening areas of the cooling gaps 4 between battery cells 1 can be gradually changed in the battery cell 1 side-by-side arrangement direction.

The temperature equalizing plate 15 is arranged in an upstream side part of the battery block. According to this arrangement, since the temperature equalizing plate 15 partially closes the some of the cooling gaps 4 whereby limiting the cooling gas flowing rate, it is possible to suppress that the some of the battery cells on the upstream side are cooled too much by the cooling gas so that the temperatures of the battery cells becomes lower and the temperature difference between the some of the battery cells and the other battery cells becomes larger. It should be noted that the temperature equalizing plate 15 does not necessarily close all of the battery cells on the side surface of the battery block. The temperature equalizing plate 15 is only required to reduce the temperature difference among the battery cells. From this viewpoint, the temperature equalizing plate has a size capable of covering some of the battery cells 1 on the upstream side as shown in FIG. 10, etc.

(Interlocking Hook 33)

The temperature equalizing plate 15 according to the embodiment shown in FIG. 10 is fastened to the end plate 10. In order to fasten the temperature equalizing plate 15 to the end plate 10, the interlocking hook 33 is arranged in the wider width part on the upstream side of the main plate portion 32. As shown in the perspective view of FIG. 13 and the cross-sectional view of FIG. 14, the interlocking hook 33 is arranged at substantially the center in the width direction and has a hook shape that has a pawl protruding toward the battery block 3. Correspondingly, an interlocking hole 34 is formed in the end plate 10 as shown in FIG. 11, and can interlock with the interlocking hook 33.

Bosses 35 are arranged protruding from the upper and lower sides of the temperature equalizing plate 15 above and below the interlocking hook 33, and can come in contact with and inserted into the end plate 10. Correspondingly, boss receiving holes 36 are formed in the end plate 10. The bosses 35 are inserted into the boss receiving holes 36. When the interlocking hook 33 is interlocked with the interlocking hole 34, and the bosses 35 are inserted into the boss receiving holes 36, the temperature equalizing plate 15 is fastened to the end plate 10.

Figure 28:
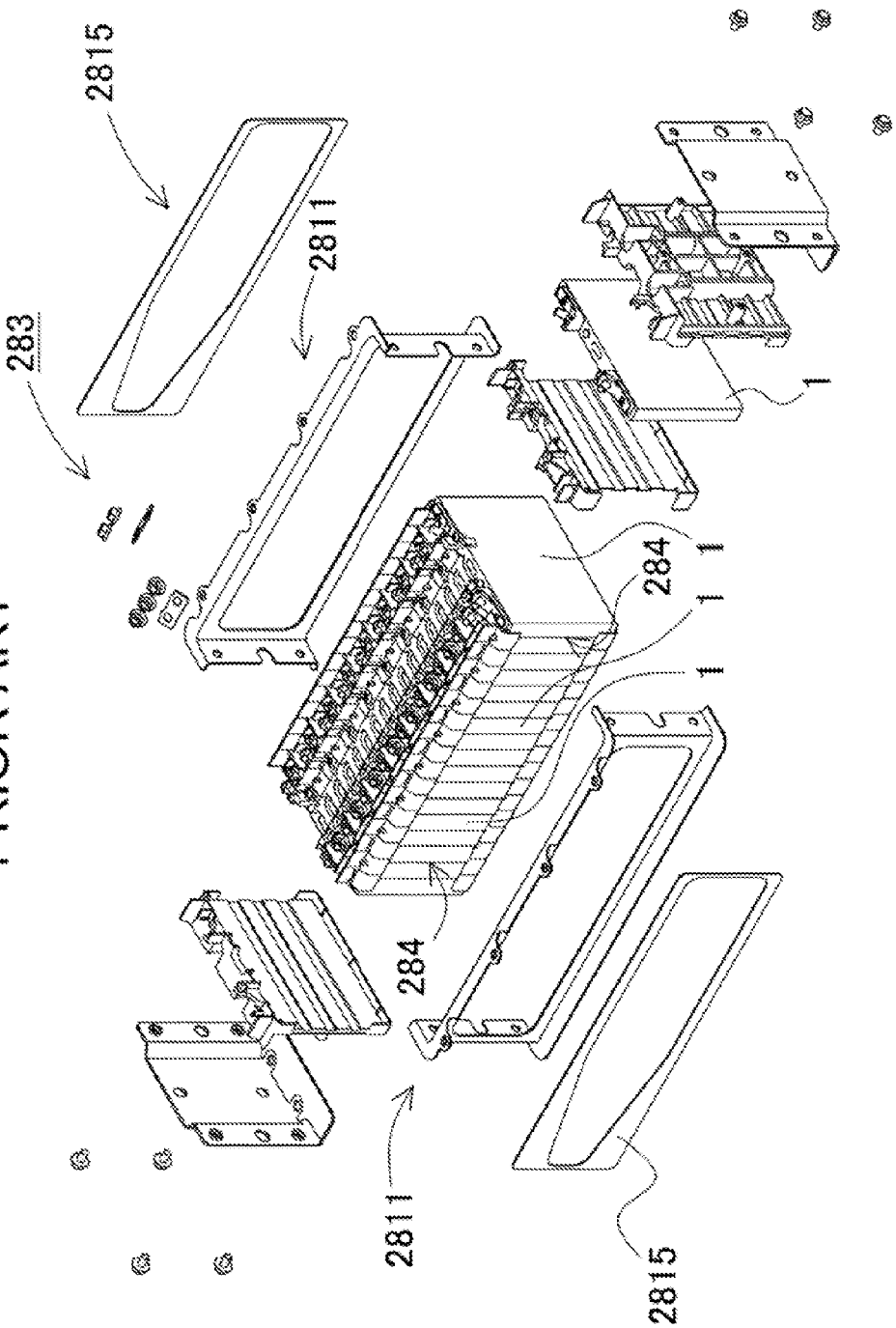
FIG. 28 is an exploded perspective view showing a power supply device that has been developed by the present applicant.
Figure 29:
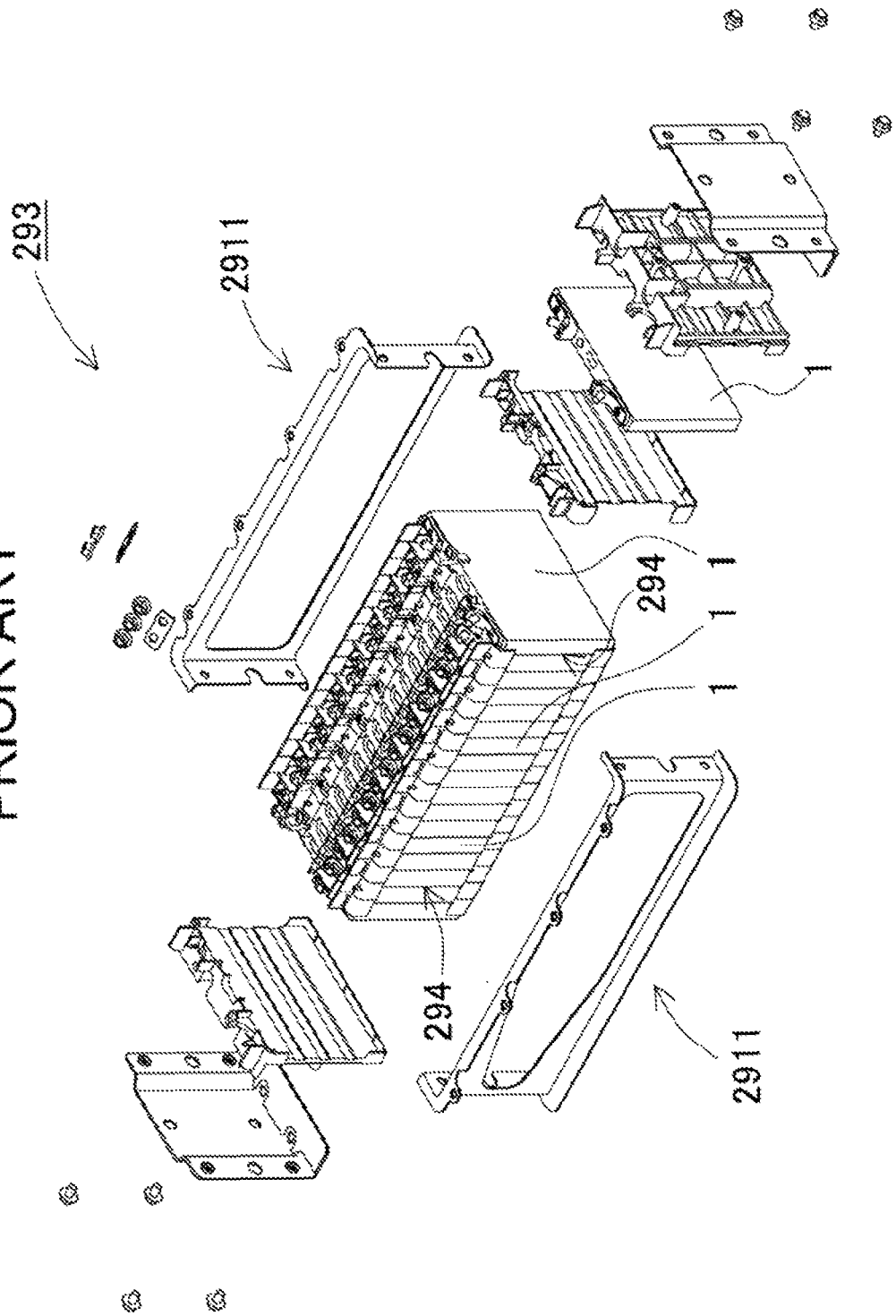
FIG. 29 is an exploded perspective view showing another power supply device that has been developed by the present applicant.

The temperature equalizing plate 15 can be formed of heat-resistant resin or from a metal plate. The temperature equalizing plate according to this embodiment is formed of heat-resistant plastic. It is preferable that the interlocking hook 33, the bosses 35, and the attachment protrusions 37 be integrally formed. In this case, the temperature equalizing plate 15 can be inexpensively manufactured. In the case where the temperature equalizing plate 15 can be inexpensively manufactured, the temperature equalizing plate 15 can be flexibly used for various types of power supply devices. That is, if a temperature equalizing plate 2815 is fastened to the bind bar 2811 as shown in FIG. 28, or if a bind bar 2911 also serves as the temperature equalizing plate as shown in FIG. 29, when the shape of the battery block is changed by changing the number of battery cells of the battery block depending on required voltages, it is necessary to redesign the temperature equalizing plate. As a result, the cost of the temperature equalizing plate will be increased. Contrary to this, in the case where the temperature equalizing plate is formed as a separated member from the bind bar, the bind bar can be easily designed so that the shape of the battery block can be easily changed at low cost. In addition, the temperature equalizing plate can have a simple attachment structure and can be easily attached. In this case, the temperature equalizing plate is advantageous in terms of manufacturing cost reduction.

In the power supply devices according to the embodiments shown in the plan views of FIGS. 3 and 8, the temperature equalizing plate is fastened to the battery block 3 only on cooling gas flowing-in-side side surface of the both side surfaces of the battery block 3. In the case where the temperature equalizing plate 15 is fastened only on the flowing-in side, even if the temperature equalizing plates are not fastened on the both side surfaces, cooling gas can sufficiently be suppressed. Accordingly, the number of temperature equalizing plates can be reduced. Therefore, it is possible to simplify the construction of the power supply device, and to reduce the cost of the power supply device.

(Attachment Protrusion 37)

The downstream side part of the temperature equalizing plate 15 is fastened to the bind bars 11X. The attachment protrusions 37 are arranged in the main plate portion 32 of the temperature equalizing plate 15 on the side opposite to the interlocking hook 33, in other words, on the cooling gas downstream side. Specifically, the temperature equalizing plate 15 includes protruding portions 38 that protrude in the vertical width direction from the upper and lower sides of the main plate portion 32, and the attachment protrusions 37 that protrude from the ends of the protruding portions 38 in the direction perpendicular to the protruding direction of the protruding portions 38, in other word, in the longitudinal direction of the main plate portion 32. Thus, the attachment protrusions 37 extend in the longitudinal direction of the bind bars 11X.

When the attachment protrusions 37 are inserted into the protrusion insertion portions 39, and the interlocking hook 33 is interlocked with the interlocking hole 34, the temperature equalizing plate 15 can be securely fastened to the battery block 3. According to this construction, it is possible to eliminate efforts to screw screws into screw holes for fastening the temperature equalizing plate to the battery block, for example. Therefore, the temperature equalizing plate can be simply fastened to the battery block in the assembling of the power supply device.

The protruding portion 38 is formed in a stepped shape so that the attachment protrusion 37 on the end of the protruding portion 38 is spaced away from the flat surface of the main plate portion 32 as shown in the perspective view of FIGS. 12 and 13, and the cross-sectional view of FIG. 17. The spacing distance between the main plate portion 32 and the attachment protrusion 37, in other words, the step height of the protruding portion 38 is designed depending on the height of the bind bar 11X from the side surface of the battery block 3. According to this construction, when the attachment protrusion 37 is inserted into the protrusion insertion portion 39 (discussed in detail later) of the bind bar 11X, the main plate portion 32 can be in contact with the side surface of the battery block 3. The main plate portion 32 is curved in a concave shape as viewed from the lateral side as shown in the cross-sectional views of FIGS. 17 and 15. According to this construction, the main plate portion 32 can surely come in tight contact with the side surface of the battery block 3. Therefore, cooling gaps 4 can surely be closed.

(Elastic Member 41)

It is more preferable that the elastic member 41 be interposed between the temperature equalizing plate 15 and the battery block 3. In the temperature equalizing plate according to the embodiment shown in the perspective view of FIG. 18, a recessed portion 40 is formed in the vertically central part along the longitudinal direction of the main plate portion 32 of the temperature equalizing plate 15B. As shown in FIG. 19, the elastic member 41 is held in the recessed portion 40. The elastic member 41 is suitably formed of a rubber sheet. Since the elastic member 41 is interposed between the temperature equalizing plate and the battery block, the temperature equalizing plate 15B can be in tight contact with the battery block 3 so that the cooling gaps 4 can be surely closed. In addition to this, it is possible to avoid that the temperature equalizing plate 15B flusters or vibrates when being strongly blown by cooling gas. Therefore, it is possible to suppress that vibration sound is produced. The elastic member 41 can be fastened to the recessed portion 40 of the main plate portion 32 with an adhesive. Alternatively, the elastic member can be fastened the temperature equalizing plate by insertion molding. Alternatively, the temperature equalizing plate may be formed of an elastic material.

The area of the elastic member 41 can be gradually reduced along the side-by-side arrangement direction of the battery cells 1 of the battery block 3. According to this construction, since the area of the elastic member 41 is changed as the area of the main plate portion 32 is changed, it is possible to further reduce the temperature difference $\Delta T$ among the battery cells.

(Protrusion Insertion Portion 39)

As shown in the perspective view of FIGS. 20 and 21, the protrusion insertion portion 39 is arranged in the bind bar 11X. The attachment protrusion 37 is inserted into the protrusion insertion portion 39. The protrusion insertion portion 39 opens toward longitudinal ends of the bind bar 11X, and has an inner height that can hold the attachment protrusion 37. The width of the attachment protrusion 37 is preferably substantially same as or barrower than the width of the bind bar 11X. According to this construction, when the attachment protrusion 37 is inserted into the protrusion insertion portion 39, the attachment protrusion 37 overlaps the bind bar 11X. Therefore, it is possible to suppress undesired protrusion of the attachment protrusion 37 toward the side surface of the battery block. Accordingly, the temperature equalizing plate 15 can be fastened to the bind bars 11X almost without changing the area of the cooling gap 4 closed by the temperature equalizing plate 15. In other words, since the size of the main plate portion 32 of the temperature equalizing plate 15 is designed so as to change the closed amounts of the cooling gaps between battery cells one by one, it can be said that protrusion or deformation of the protrusion insertion portion toward the side surface of the battery block 3 is preferably minimized. Since the protrusion insertion portions 39 are attached to the bind bars 11X so as to overlap the bind bars 11X as discussed above, the protrusion amounts of the protrusion insertion portions 39 toward the side surface of the battery block 3 are minimized to an amount not greater than necessary, that is, to the protruding portions 38 that couple the main plate portion 32 to the attachment protrusions 37. As a result, it is possible to suppress that cooling gaps are affected by the protrusion insertion portions 39.

It is more preferable that the protruding portions 38 be designed to be arranged at positions of the main plate portion 32 so that the protruding portion 38 overlaps the battery cell 1, in other words, at positions where the protruding portions 38 do not close the cooling gap 4 as shown in FIG. 10. According to this construction, it is possible avoid that the protruding portions 38 close the cooling gap. As a result, the temperature equalizing plate 15 can serve essentially to gradually reduce the closed amount of the cooling gaps between the battery cells one by one along the cooling gas flowing direction, in other words, to gradually increase the rate of cooling gas flowing into the cooling gaps between the battery cells one by one along the cooling gas flowing direction.

Figure 30:
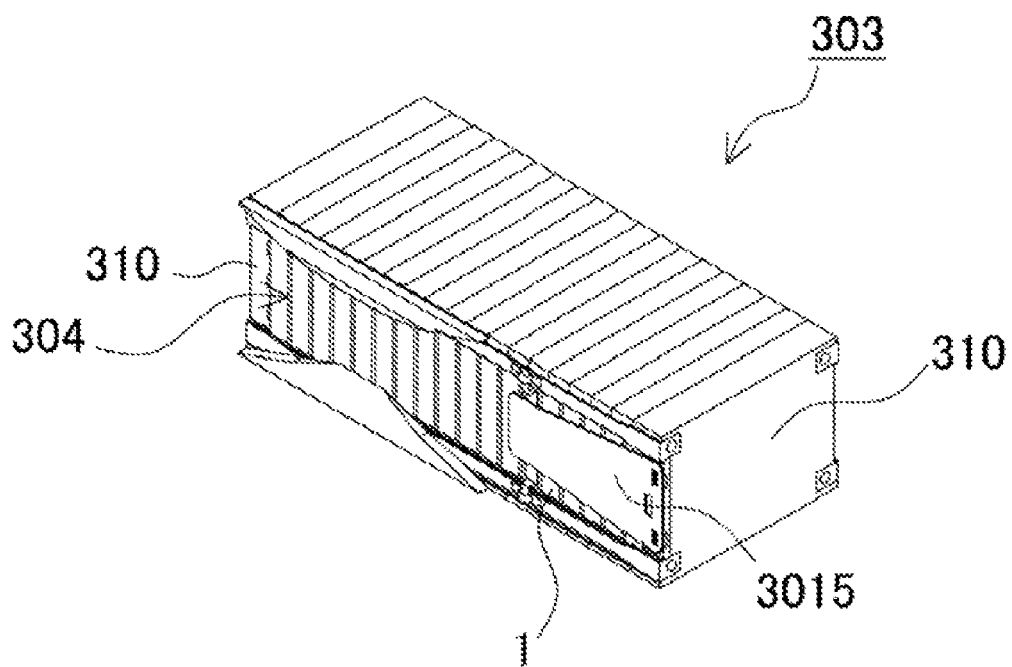
FIG. 30 is an exploded perspective view showing still another power supply device that has been developed by the present applicant.

In addition, since the attachment protrusion 37 extends along the longitudinal direction of the bind bar 11X, there is an advantage that the attachment protrusion 37 can be long. That is, if the attachment protrusion 37 extends in the direction perpendicular to the bind bar 11X as shown in FIG. 30, the length of the attachment protrusion 37 must be short. Accordingly, the contact area of the attachment protrusion with the protrusion insertion portion 39 becomes small. As a result, the attachment strength between the attachment protrusion and the protrusion insertion portion becomes relatively low. Contrary to this, since the attachment protrusion 37 is arranged at the position where the attachment protrusion 37 overlaps the bind bar 11X, the length of the attachment protrusion 37 can be sufficiently increased. Correspondingly, the length of the protrusion insertion portion 39 can be increased. Thus, the contact resistance between the attachment protrusion and the protrusion insertion portion can be increased. Accordingly, the temperature equalizing plate 15 can be stably held for a long time. Therefore, it is possible to improve the reliability of the power supply device.

The length of the protrusion insertion portion 39 is designed in accordance with the length of the attachment protrusion 37. The protrusion insertion portion 39 preferably has a depth that allows at least a half length of the attachment protrusion 37 to be inserted into the protrusion insertion portion 39. In the protrusion insertion portion according to the embodiment shown in FIGS. 20 and 21, the sectionally C-shape protrusion insertion portion 39 is formed by bending each of the ends of a metal strip into a U shape as viewed in section. The protrusion insertion portion 39 has a slit that extends along the center line of the protrusion insertion portion. Accordingly, it is easy to deform the protrusion insertion portion 39. Therefore, it is easy to adjust the inner height of the protrusion insertion portion 39.

Although the protrusion insertion portion 39 is formed from a metal strip that is a separated member from the separate bind bar 11X and is fixed onto the separate bind bar 11X by welding or the like in the case of FIG. 21, the protrusion insertion portion may be formed integrally with the bind bar. For example, a metal plate can be used that includes protruding parts that protrude upward and downward from the central parts of the metal plate. In this case, the protrusion insertion portion can be formed by bending the protruding parts.

The bind bar 11X is formed of metal such as aluminum. End parts of the bind bar 11X are bent that have a certain length, and serve as parts to be fastened to the end plate 10. The protrusion insertion portion 39 is not limited to the aforementioned structures. Other structures can be suitably used into which the attachment protrusion 37 can be inserted. In a bind bar 11Y according to a modified embodiment shown in FIGS. 22 and 23, one portion to be bent is formed integrally with a bar part, and protrudes from only one edge part. This one portion is bent, and the free end of the one portion is fixed to the bar part by welding. Thus, a protrusion insertion portion 39Y is formed. Since this protrusion insertion portion 39Y can be formed without using a separated member from the bind bar, the bind bar can be inexpensively manufactured.

It is more preferable that the bind bar have a symmetrical shape. The bind bar 11X according to the embodiment shown in FIG. 20, etc. includes two protrusion insertion portions 39 that are arranged at the symmetrical positions with respect to the center in the longitudinal direction of the bind bar 11X. In this bind bar 11X, one of the protrusion insertion portion 39 (on right side in FIG. 20) is used, but the other protrusion insertion portion 39 (second protrusion insertion portion 39B on the left side in FIG. 20) is not used. According to this construction, since the bind bar 11X has a symmetrical shape with respect to the horizontal and vertical lines, the bind bar 11X can be used irrespective of orientation of the bind bar 11X. Accordingly, the orientation mistake can be eliminated when the power supply device is assembled. Therefore, the assembling efficiency can be improved.

In addition, in the case where a plurality of battery blocks 3 are arranged side by side in parallel to each other, two protrusion insertion portions 39 of one battery block 3 can contact two protrusion insertion portions of another adjacent battery block. Accordingly, the contact stress can be distributed to two protrusion insertion portions 39. As a result, battery blocks 3 can be more firmly interposed between and held by holding members. For this reason, this construction is preferable in terms of reliability. Specifically, as shown in the plan view of FIG. 24, in the case where the battery blocks 3 are arranged in parallel to each other in an exterior case 20, and are held by brackets or the like, the protrusion insertion portions 39 of the bind bars 11X contact each other. As a result, the battery blocks 3 can be firmly held at the contact parts between the metal members. In addition, when the protrusion insertion portions 39 are pressed toward each other, and are slightly deformed, the inner height of the protrusion insertion portions 39 will be reduced. As a result, there is a secondary advantage that the attachment protrusion 37 inserted into the deformed protrusion insertion portion 39 can be more reliably fastened to the bind bar so that the temperature equalizing plate 15 is prevented from being detached from the bind bar.

The temperature equalizing plate 15 according to the foregoing embodiment is fastened to the battery block 3 by using a fit-in structure. The fit-in structure can eliminate screwing and welding efforts, etc., and fastens the temperature equalizing plate to the battery block in a snap-in manner. Therefore, the fit-in structure can provided excellent workability. However, the attachment structure of the temperature equalizing plate according to the present invention is not limited to the fit-in structure. The temperature equalizing plate can be fastened to the surfaces of the bind bars 11X by screws, an adhesive, a welding method or the like depending on required strength and reliability. The fit-in structure used in the present invention is not limited to the aforementioned construction. Any existing fit-in mechanisms can be suitably used.

(Temperature Equalizing Walls 8, 58)

Temperature equalizing walls 8 and 58 are arranged in the inlet ducts 6, 56 and 76 to reduce the temperature difference among the battery cells 1. The temperature equalizing walls 8 and 58 have an elongated shape. Their entire length in the cooling gas flowing direction is longer than their width. In the temperature equalizing walls 8 and 58, one end part on the upstream side is tapered to get thinner toward the tip end. In the temperature equalizing walls 8 and 58 shown in FIGS. 4-5 and 8, the other end part on the downstream side also gets thinner toward the tip end. Accordingly, it is possible to suppress that the cooling gas flow become turbulent. As a result, cooling gas can smoothly flow. A turbulent flow in the inlet ducts 6 and 56 and 76 may increase pressure loss. For this reason, in the case where the both end parts of the temperature equalizing walls 8 and 58 on the upstream and downstream sides get thinner toward the tip ends, it is possible to reduce pressure loss caused by turbulent flow.

In the illustrated temperature equalizing walls 8 and 58, the end parts on the upstream and the downstream sides are inclined so that the vertical width of the end parts gets smaller toward the tip ends. Thus, the entire shape of the temperature equalizing walls 8 and 58 is a trapezoid the center part of which is high. In the power supply devices shown in FIG. 5, the temperature equalizing walls 8 and 58 are arranged at opposed upper and lower positions in the inlet ducts 6, 56 and 76. In the temperature equalizing walls 8 and 58 arranged at the lower position in the inlet duct 6, 56 and 76, the end parts are inclined downward toward the tip ends. In the temperature equalizing walls 8 and 58 arranged at the upper position in the inlet duct 6, 56 and 76, the end parts are inclined upward toward the tip ends. The temperature equalizing walls 8 and 58 have a trapezoidal shape as a whole. In the case where the temperature equalizing walls 8 and 58 are arranged at the upper and lower positions in the inlet ducts 6, 56 and 76, the temperature difference among the battery cells can be reduced by the temperature equalizing walls 8 and 58 with low height, i.e., small vertical width. As a result, it is possible to further reduce pressure loss, and additionally to reduce he temperature difference among the battery cells. However, in the power supply device according to the present invention, the temperature equalizing walls are not necessarily arranged at the upper and lower positions in the inlet duct. For example, although not illustrated, the temperature equalizing wall may be arranged only at the upper position or at the lower position in the inlet duct.

In addition, the temperature equalizing walls 8 and 58 have tapered portions 8A and 58A the horizontal width of which gets smaller toward the top end edges of the temperature equalizing walls 8 and 58. Thus, the interval between the temperature equalizing walls 8 and 58 and the surface of the battery block 3 gets larger toward the top end edges of the temperature equalizing walls 8 and 58. In the tapered portions 8A and 58A of the temperature equalizing walls 8 and 58 at the lower position, the horizontal width gradually decreases toward the top side. Accordingly, the interval between the temperature equalizing walls 8 and 58 and the surface of the battery block 3 gradually increases toward the top side. In the tapered portions 8A and 58A of the temperature equalizing walls 8 and 58 at the upper position, the horizontal width gradually decreases toward the bottom side. Accordingly, the interval between the temperature equalizing walls 8 and 58 and the surface of the battery block 3 gradually increases toward the bottom side. In the temperature equalizing walls 8 and 58 shown in FIG. 5, the tapered portions 8A and 58A are not entirely formed. The temperature equalizing walls 8 and 58 include upper and lower parts of the taper portions 8A and 58A, and wide portions 8B and 58B. In the lower temperature equalizing walls 8 and 58, the wide portions 8B and 58B are arranged on the lower side, and the tapered portions 8A and 58A are arranged on the upper side. In the upper temperature equalizing walls 8 and 58, the wide portions 8B and 58B are arranged on the upper side, and the tapered portions 8A and 58A are arranged on the lower side. The wide portions 8B and 58B are shaped without horizontal width variation or with their horizontal width being changed in the vertical direction at an inclination smaller than the taper portions 8A and 58A. Thus, the wide portions 8B and 58B have vertical or nearly vertical side surfaces.

In the power supply device of FIGS. 4 to 5, the inlet duct 6 is arranged between the two rows of battery blocks 3. The temperature equalizing wall 8 is arranged in this inlet duct 6. For this reason, the both surfaces of the tapered portion 8A of the temperature equalizing wall 8 are inclined at the same inclination angle ($\alpha$). Thus, the intervals between the temperature equalizing wall 8, and the opposed surfaces of the battery blocks 3 are the same. The reason is that the battery cells 1 of the battery blocks 3 on the both sides can be evenly cooled. In the power supply device, the inlet ducts 56 are arranged outside the two rows of battery blocks 3. The temperature equalizing walls 58 are arranged in these inlet ducts 56. For this reason, the tapered portion 58A of the temperature equalizing wall 58 has an inclined surface as the inside surface opposed to the surface of the battery block 3, and a vertical surface as the outside surface. The inclination angles ($\alpha$) of the temperature equalizing walls 58 are the same that are opposed to each other and arranged in the inlet ducts 56 located on both the outsides of the two rows of the battery blocks 3. Thus, the intervals between the temperature equalizing walls 58 and the surfaces of the battery blocks 3 are symmetrical with respect to a line. The reason is that the battery cells 1 of the two columns of battery blocks 3 can be evenly cooled.

The inclination angle ($\alpha$) of the taper portions 8A and 58A with respect to the horizontal plane can be obtained from the horizontal width of the wide portions 8B and 58B, and the height of the tapered portions 8A and 58A. The tapered portion can be high when inclination angle ($\alpha$) is large and the horizontal width of the wide portion is large. The tapered portion can be low when inclination angle ($\alpha$) is small and the horizontal width of the wide portion is small.

In the aforementioned temperature equalizing walls 8 and 58, the length in the cooling gas flowing direction and the height of the tapered portions 8A and 58A are adjusted to values that can minimize the temperature difference among the battery cells 1. In the power supply devices shown in FIGS. 3 and 8, the temperature of a battery cell arranged on the downstream side in the cooling gas flowing direction will be higher than a battery cell 1 on the upstream side. In the power supply devices shown FIGS. 3 and 8, in order to reduce the temperature of the battery cell on the downstream side and to reduce the temperature difference among the battery cells 1, the temperature equalizing walls 8 and 58 are arranged on the downstream side in the inlet ducts 6, 56, and 76. In the temperature equalizing walls 8 and 58, the length of the cooling gas flowing direction and the height of the tapered portions 8A and 58A are adjusted so as to further reduce the temperature difference among a half of battery cells that are arranged on the downstream side.

In a power supply device without the temperature equalizing wall, the temperature difference occurs between a half of the whole battery cells (i.e., nine battery cells) arranged on the upstream side and another half of the battery cells arranged on the downstream side. In particular, the temperature of the nine battery cells arranged on the downstream side will be high, and as a result the temperature difference will be also large. In battery cells 1 that are arranged on the inlet and outlet sides of the inlet ducts 6, 56 and 76, their temperature will be lower. The reason is that the end plates 10 on the both sides cool these battery cells 1. In addition, since cool gas flows from the inlet side, the temperature of a battery cell arranged on the downstream side will be the highest. In nine battery cells that are arranged on the downstream side, the temperature of a fourteenth battery cell arranged in the center of the nine battery cells will be the highest. The temperature of the battery cells will get lower as closer to the upstream and downstream side relative to the battery cell arranged in the center of the downstream side battery cells. For example, when the temperature of the battery cell arranged in the center of the downstream side battery cells rises to about 34° C., the temperature of the battery cell arranged to the both ends of the downstream side battery cells (i.e., tenth and eighteenth battery cells) will be 30° C. or lower. In this case, the lowest temperature of a battery cell among battery cells on the upstream side will be 23° C.

In the illustrated power supply device, in order to more efficiently cool battery cells 1 arranged on the downstream side of the inlet ducts 6, 56 and 76, the temperature equalizing walls 8 and 58 are arranged on the downstream side of the inlet ducts 6, 56 and 76. In the temperature equalizing walls 8 and 58, the length of the cooling gas flowing direction and the height of the tapered portions 8A and 58A are adjusted so as to reduce the temperatures of, and the temperature difference among the battery cells 1 that are arranged on the downstream side. The temperature equalizing walls 8 and 58 are arranged in the inlet ducts 6, 56 and 76, and allow forcedly-blown cooling gas to more efficiently flow into the cooling gaps 4 whereby reducing the temperature of a battery cell 1 that is likely to increase in temperature.

In the power supply devices shown in FIGS. 4 to 5, the wide portions 8B and 58B of the temperature equalizing walls 8 and 58 are arranged at positions facing the bind bars 11X of the battery block 3, and the tapered portions 8A and 58A of the temperature equalizing walls 8 and 58 are arranged at positions facing the exposed portion 14B of the battery block 3. That is, the wide portions 8B and 58B are arranged outside the closed portions 14A of the battery block 3, while the tapered portions 8A and 58A are arranged outside the exposed portion 14B. In the power supply device, the wide portion 8B of the temperature equalizing wall 8 is arranged between the bind bars 11X of the battery blocks 3 arranged in two rows, while the tapered portion 8B of the temperature equalizing wall 8 is arranged between the exposed portions 14B of the two rows of the battery block 3.

In the closed portion 14A, since openings 14 is closed by the bind bars 11X, even if cooling gas flows outside the closed portion 14A, the cooling gas cannot flow into cooling gaps 4 in the closed portion 14A. In the power supply devices shown in the cross-sectional views of FIG. 8, the wide portions 8B and 58B of the temperature equalizing walls 8 and 58 arranged on the downstream side are arranged without a gap between the wide portion 8B or 58B and the bind bar 11X of the coupling member 11, or close to the bind bar. On the downstream side of the battery block 3 in the thus-configured power supply device, cooling gas does not flow outside the closed portions 14A closed by the bind bars 11X, while all the forcedly-blown cooling gas flows in the exposed portion 14B of the battery block 3 and can smoothly and efficiently flows from the exposed portion 14B into cooling gaps 4 so that battery cells 1 are efficiently cooled.

In addition, the tapered portions 8A and 58A protrude toward the exposed portion 14B. The vertical width of the tapered portions 8A and 58A are large in an area in that the battery temperature is likely to be high. Thus, the tapered portions 8A and 58A are arranged facing the exposed portion 14B. Accordingly, cooling gas blown into the inlet ducts 6, 56 and 76 flows between the tapered portions 8A and 58A, and the exposed portion 14B, and is accelerated by the tapered portions 8A and 58A. In addition, the cooling gas is smoothly guided into cooling gaps 4 by the tapered portions 8A and 58A. As a result, battery cells 1 are efficiently cooled. Accordingly, in the temperature equalizing walls 8 and 58, since a part of the tapered portions 8A and 58A with the largest vertical width is arranged in an area where battery cells 1 are likely to increase in temperature to the highest, it is possible to more efficiently cool battery cells that are likely to increase in temperature as compared with other battery cells. Therefore, it is possible reduce the battery temperature of battery cells that are likely to increase in temperature. According to the temperature equalizing walls 8 and 58, the vertical width of the tapered portions 8A and 58A can adjust the efficiency of cooling a battery cell that is more likely to increase in temperature higher, while the length in the cooling gas flowing direction of the tapered portions 8A and 58A can define battery cells to be more efficiently cooled. In the power supply devices shown in FIGS. 3 to 5, and 8, in order to more efficiently cool battery cells on the downstream side, the temperature equalizing walls 8 and 58 are arranged on the downstream side in the inlet ducts 6, 56 and 76. In addition, the height of the tapered portions 8A and 58A is increased in an area where battery cells among the battery cells on the downstream side are likely to increase in temperature higher. As discussed above, the length of the temperature equalizing walls 8, 58 and 78 can adjust the number of battery cells to be efficiently cooled. Also, the vertical width of the temperature equalizing walls 8 and 58 can adjust the efficiency of cooling a battery cell that is likely to increase in temperature higher. The temperature equalizing walls 8 and 58 are arranged in an area where battery cells are likely to increase in temperature higher if the temperature equalizing walls 8 and 58 are not provided. The height of the tapered portions 8A and 58A can adjust the maximum temperature of a battery cell that is likely to increase in the temperature to the highest to a certain lowered temperature. Thus, the temperature difference in the power supply device can be minimized.

Although the temperature difference among the battery cells is reduced by using the temperature equalizing plate 15 and the temperature equalizing wall in the power supply device according to the foregoing embodiment, the power supply device according to the present invention does not necessarily include the temperature equalizing wall. That is, the temperature equalizing wall may be omitted.

In the aforementioned power supply device, the battery blocks 3 are secured in place to the exterior case 20. In the power supply device shown in FIGS. 1 and 2, the exterior case 20 is composed of a lower case 20A and an upper case 20B. The upper case 20B and the lower case 20A have flange portions 21 that protrude outward. The flange portions 21 are secured to each other by bolts 24 and nuts 25. In the illustrated exterior case 20, the flange portions 21 are arranged on the battery block 3 side surfaces. However, the flange portion may be arranged on the upper or lower part of the battery block, or at the center between the upper and lower parts. In this exterior case 20, the end plates 10 are secured to the lower case 20A by fastening screws (not shown) so that the battery blocks 3 are secured. The fastening screws are passed through the lower case 20A, and are screwed into threaded holes (not shown) of the end plates 10 so that the battery blocks 3 are secured to the exterior case 20. The heads of the fastening screws protrude from the lower case 20A. The battery blocks 3 are secured to the interior surface of the exterior case 20 shown in FIGS. 1 and 2. The air ducts 5 are formed between the battery block 3 outside surfaces, and the interior surfaces of side walls 22 of the exterior case 20.

Also, end surface plates 30 are attached to the exterior case 20. The end surface plate 30 is formed of plastic or the like integrally with a connection duct 31 that is connected to the air ducts 5 composed of the inlet and outlet ducts 6 and 7 when the end surface plate 30 is coupled to the battery blocks 3. The connection duct 31 protrudes outward. The connection duct 31 is connected to the blower mechanism 9, or to an exhaust duct (not shown), which exhausts cooling gas from the power supply device. Although not illustrated, the end surface plate is coupled to the end plate of the battery blocks by an interlocking structure. However, the end surface plate may be coupled to the battery blocks or the exterior case by a coupling structure other than the interlocking structure.

The aforementioned power supply devices can be used as a battery system for vehicles. The power supply device can be installed on electric vehicles such as hybrid cars that are driven by both an engine and a motor, and electric vehicles that are driven only by a motor. The power supply device can be used as a power supply device for these types of vehicles.

Figure 25:
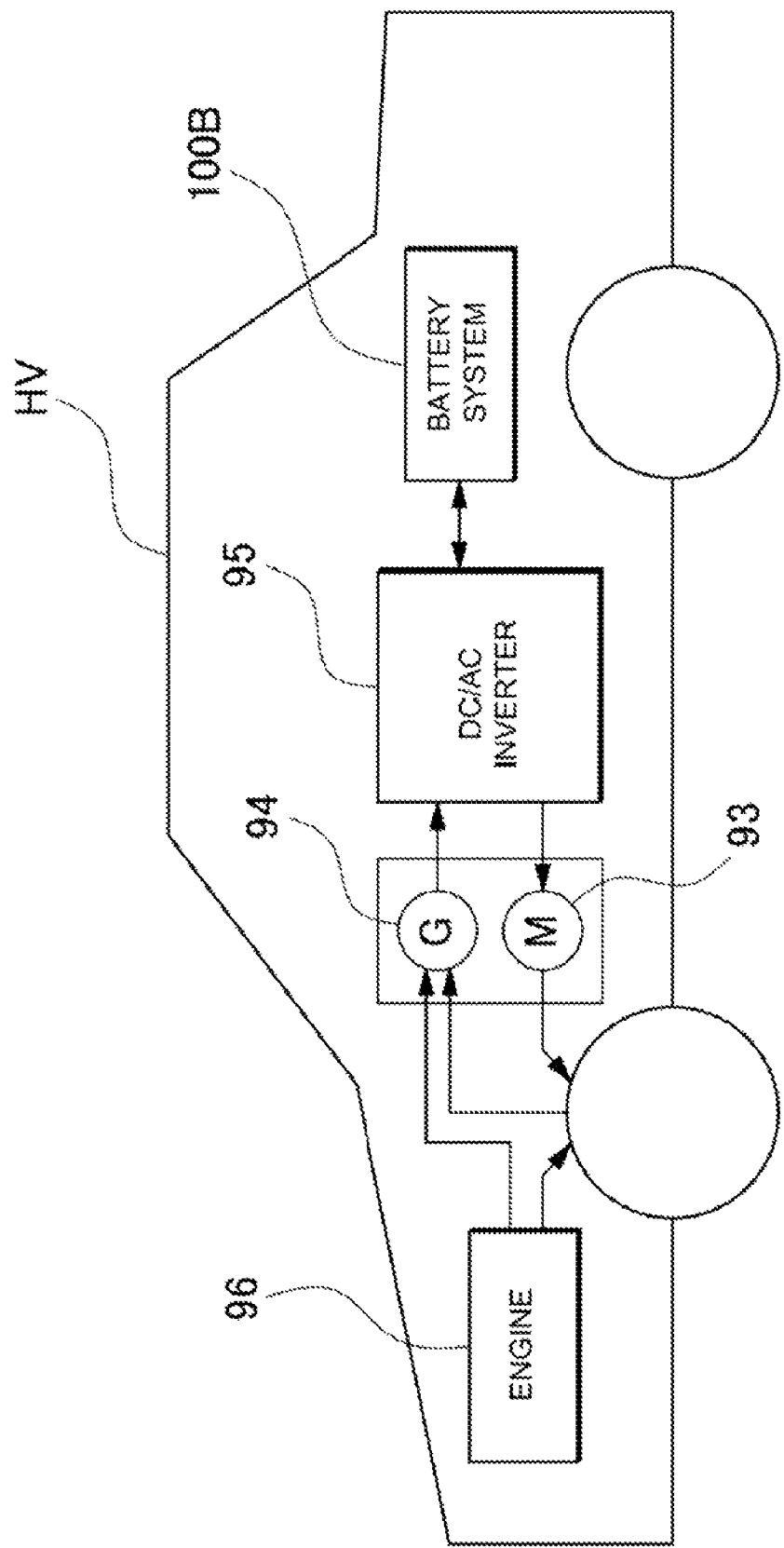
FIG. 25 is a block diagram showing an exemplary hybrid car that is driven by an engine and an electric motor, and includes the power supply device.

FIG. 25 is a block diagram showing an exemplary hybrid car that is driven both by an engine and an electric motor, and includes the power supply device. The illustrated vehicle HV with the power supply device includes an electric motor 93 and an engine 96 that drive the vehicle HV, a battery system 1006 that supplies electric power to the electric motor 93, and an electric generator 94 that charges batteries of the battery system 100B. The battery system 100B is connected to the electric motor 93 and the electric generator 94 via a DC/AC inverter 95. The vehicle HV is driven both by the electric motor 93 and the engine 96 with the batteries of the battery system 100B being charged/discharged. The electric motor 93 is energized with electric power and drives the vehicle in a poor engine efficiency range, e.g., in acceleration or in a low speed range. The electric motor 93 is energized by electric power is supplied from the battery system 100B. The electric generator 94 is driven by the engine 96 or by regenerative braking when users brake the vehicle so that the batteries of the battery system 100B are charged.

Figure 26:
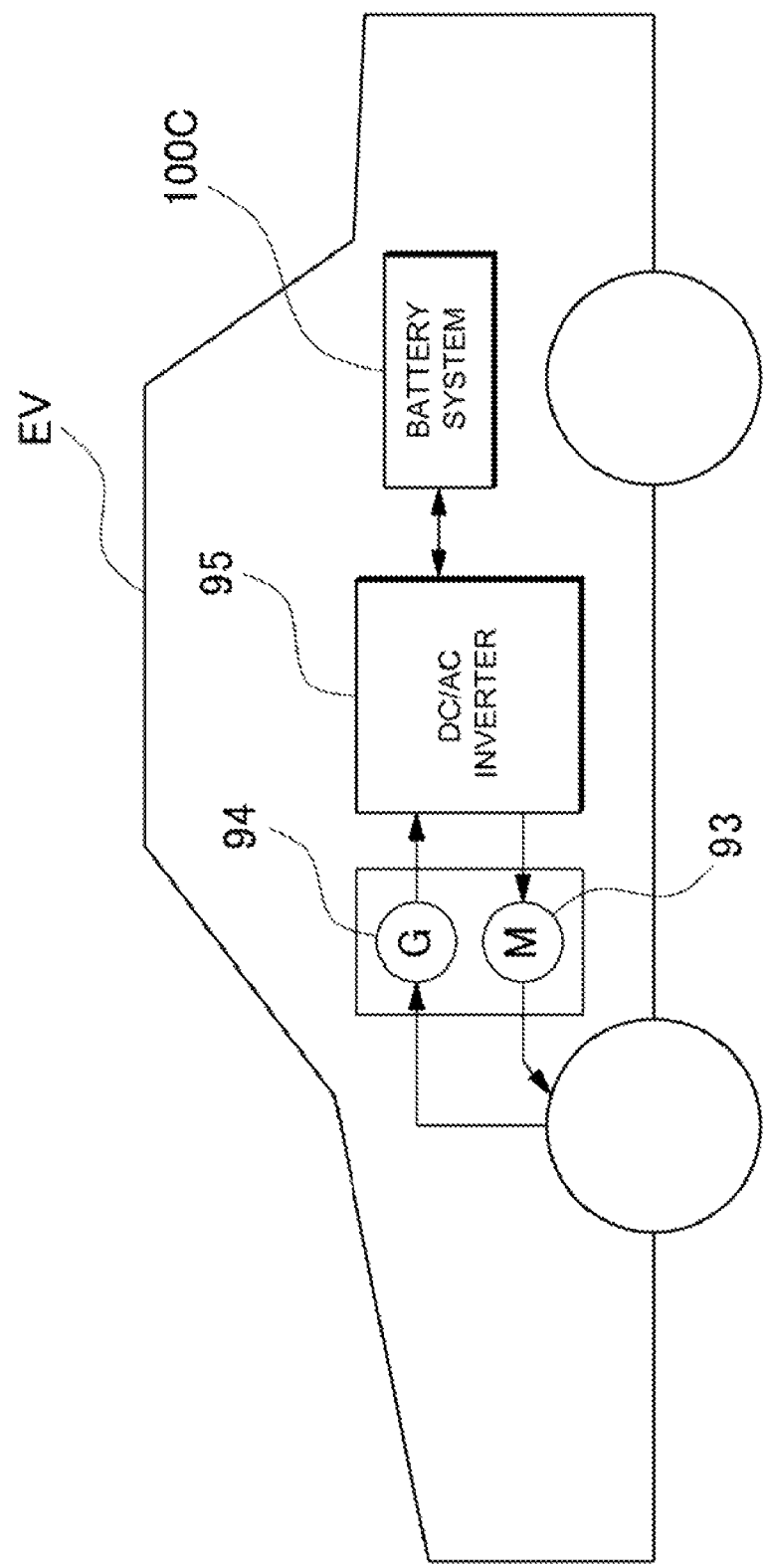
FIG. 26 is a block diagram showing an exemplary electric vehicle that is driven only by an electric motor, and includes the power supply device.
Figure 27:
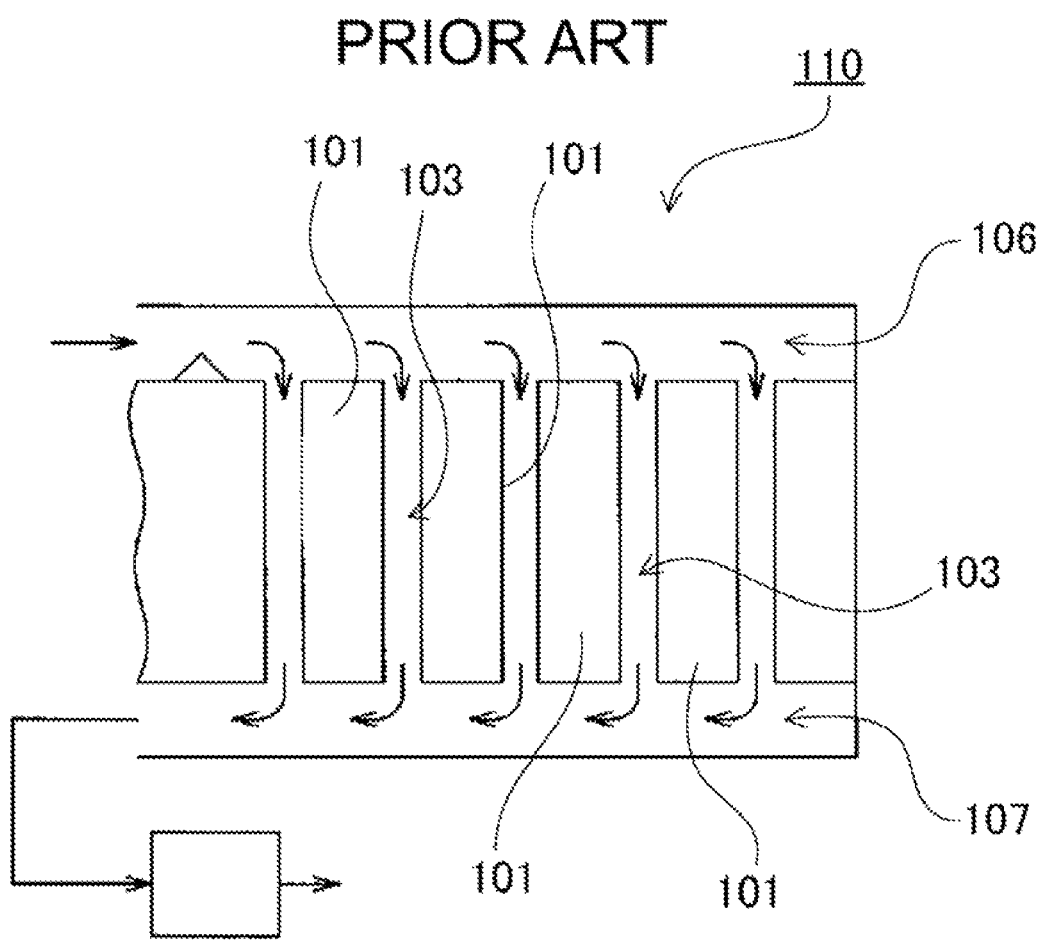
FIG. 27 is a horizontal cross-sectional view showing a known power supply device.

FIG. 26 shows an exemplary electric vehicle that is driven only by an electric motor, and includes the power supply device. The illustrated vehicle EV with the power supply device includes an electric motor 93 that drives the vehicle EV, a battery system 100C that supplies electric power to the electric motor 93, and an electric generator 94 that charges batteries of the battery system 100C. The electric motor 93 is energized by electric power that is supplied from the battery system 100C. The electric generator 94 can be driven by vehicle EV regenerative braking so that the batteries of the battery system 100C are charged.

(Power Storage Type Power Supply Device)

Figure 31:
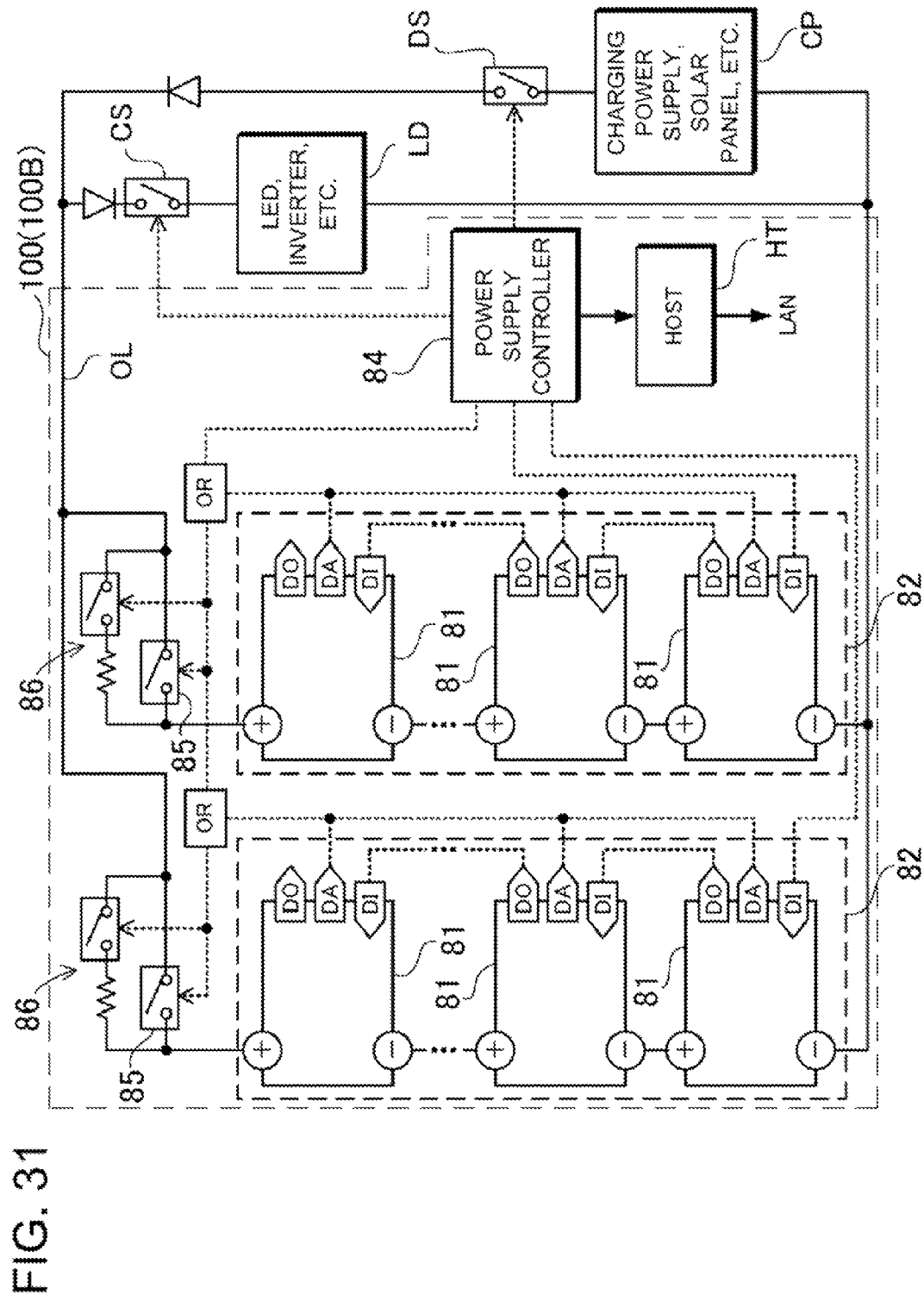
FIG. 31 is a block diagram a power storage type power supply device to which the present invention is applied.

The power supply device can be used not only as power supply of mobile unit but also as stationary power storage device. For example, examples of stationary power storage devices can be provided by an electric power system for home use or plant use that is charged with sunlight or with midnight electric power and is discharged when necessary, a power supply for street lights that is charged with sunlight during the daytime and is discharged during the nighttime, or a backup power supply for signal lights that drives signal lights in the event of a power failure. FIG. 31 shows a circuit diagram according to this embodiment. This illustrated power supply device 100 includes battery units 82 each of which includes a plurality of battery packs 81 that are connected to each other. In each of battery packs 81, a plurality of battery cells are connected to each other in serial and/or in parallel. The battery packs 81 are controlled by a power supply controller 84. In this power supply device 100, after the battery units 82 are charged by a charging power supply CP, the power supply device 100 drives a load LD. The power supply device 100 has a charging mode and a discharging mode. The Load LD and the charging power supply CP are connected to the power supply device 100 through a discharging switch DS and a charging switch CS, respectively. The discharging switch DS and the charging operation switch CS are turned ON/OFF by the power supply controller 84 of the power supply device 100. In the charging mode, the power supply controller 84 turns charging operation switch CS ON, and turns the discharging switch DS OFF so that the power supply device 100 can be charged by the charging power supply CP. When the charging operation is completed so that the battery units are fully charged or when the battery units are charged to a capacity not lower than a predetermined value, if the load LD requests electric power, the power supply controller 84 turns the charging operation switch CS OFF, and turns the discharging switch DS ON. Thus, operation is switched from the charging mode to the discharging mode so that the power supply device 100 can be discharged to supply electric power to the load LD. In addition, if necessary, the charging operation switch CS may be turned ON, while the discharging switch DS may be turned ON so that the load LD can be supplied with electric power while the power supply device 100 can be charged.

The load LD driven by the power supply device 100 is connected to the power supply device 100 through the discharging switch DS. In the discharging mode of the power supply device 100, the power supply controller 84 turns the discharging switch DS ON so that the power supply device 100 is connected to the load LD. Thus, the load LD is driven with electric power from the power supply device 100. Switching elements such as FET can be used as the discharging switch DS. The discharging switch DS is turned ON/OFF by the power supply controller 84 of the power supply device 100. The power supply controller 84 includes a communication interface for communicating with an external device. In the power supply device according to the embodiment shown in FIG. 31, the power supply controller is connected to a host device HT based on existing communications protocols such as UART and RS-232C. Also, the power supply device may include a user interface that allows users to operate the electric power system if necessary.

In addition, this power supply device 100 has an equalizing mode for equalizing of the states of the battery units 82. The battery units 82 are connected to an output line OL through parallel connection switched 85, and are connected in parallel to each other. For this reason, the power supply device includes equalization circuits 86 that are controlled by the power supply controller 84. The equalization circuits 86 suppress variation of the battery remaining capacities among the battery units 82.

Industrial Applicability

A vehicle power supply device, a vehicle including the vehicle power supply device, and a capacity equalizing method of a power supply device according to the present invention can be suitably applied to a capacity equalizing method of plug-in hybrid vehicles and hybrid electric vehicles that can switch between the EV drive mode and the HEV drive mode, electric vehicles, and the like.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2010-017,492 filed in Japan on Jan. 28, 2010, the content of which is incorporated herein by reference.

What is claimed is:

1. A power supply device comprising:
    a battery block that includes a plurality of battery cells arranged side by side, cooling gaps being provided for flowing cooling gas between battery cells;
    a coupling member that extends in the side-by-side arrangement direction of the battery cells and couples said plurality of battery cells to each other in the side-by-side arrangement; and
    a temperature equalizing plate that is arranged on a side surface of said battery block and at least partially closes openings of some of the cooling gaps on the cooling gas inlet side of said cooling gaps,
    wherein the cooling gas is blown from the side surface of said battery block into said cooling gaps so that said battery cells are cooled,
    wherein the width of the temperature equalizing plate, which covers the side surface of said battery block, varies so that the amounts of the cooling gas flowing into said cooling gaps are reduced as the battery cells are located closer to the cooling gas upstream side,
    wherein the cooling gas upstream side of said temperature equalizing plate is fastened to said battery block, and said temperature equalizing plate includes an attachment protrusion that protrudes from the cooling gas downstream side of said temperature equalizing plate,
    wherein a protrusion insertion portion is arranged at a position of said coupling member corresponding to the attachment protrusion on the side surface of said battery block so that said attachment protrusion can be inserted into the protrusion insertion portion, and
    wherein when the attachment protrusion of said temperature equalizing plate is inserted in the protrusion insertion portion of said coupling member, said temperature equalizing plate is attached to said coupling member.

2. The power supply device according to claim 1, wherein said temperature equalizing plate has a recessed surface on the side opposed to said battery block, wherein an elastic member is arranged on said recessed surface.

3. The power supply device according to claim 2, wherein the width of said elastic member gradually decreases along the side-by-side arrangement direction of the battery cells of said battery block.

4. The power supply device according to claim 1, wherein said temperature equalizing plate is curved protruding toward said battery block.

5. The power supply device according to claim 1, wherein the shape of said temperature equalizing plate is an isosceles trapezoid.

6. The power supply device according to claim 1, wherein said temperature equalizing plate is fastened only on the cooling gas inlet-side side surface of the both side surfaces of the battery block.

7. The power supply device according to claim 1, wherein said coupling member is a metal bind bar that has a constant width and extends in the side-by-side arrangement direction of said battery cells, wherein said attachment protrusion protrudes along the extension direction of said bind bar, and has a width equal to or narrower than the width of said bind bar.

8. The power supply device according to claim 7, wherein said protrusion insertion portion is formed by bending each of a pair of metal protrusions that protrude in the width direction of said bind bar into a U shape as viewed in section.

9. The power supply device according to claim 1, wherein said temperature equalizing plate further includes a protruding portion that couples said attachment protrusion to the temperature equalizing plate, wherein when said temperature equalizing plate is fastened onto the side surface of said battery block, said protruding portions overlap one of the battery cells of said battery block.

10. The power supply device according to claim 1, wherein a second protrusion insertion portion is arranged at the symmetrical position to said protrusion insertion portion with respect to the center of said coupling member in the extension direction, and have the same shape as said protrusion insertion portion.

11. The power supply device according to claim 1 further comprising end plates that hold said side-by-side arranged battery cells so that said side-by-side arranged battery cells are sandwiched between the end plates from both the ends of said battery block, wherein said temperature equalizing plate includes an interlocking hook on the side opposite to said attachment protrusions, wherein said end plate has an interlocking hole that interlocks with said interlocking hook, wherein when said interlocking hook is interlocked with said interlocking hole, the cooling gas upstream side of said temperature equalizing plate is fastened to said battery block.

12. The power supply device according to claim 1 further comprising electrically-insulating separators that are sandwiched between battery cells so that said cooling gaps are formed in said battery block.

13. The power supply device according to claim 1, wherein said battery cells are rectangular batteries.

* * * * *